United States Patent
Franklin et al.

(10) Patent No.: US 12,373,886 B1
(45) Date of Patent: Jul. 29, 2025

(54) CAMERA GUIDE ALIGNMENT AND AUTO-CAPTURE SYSTEM WITH IMAGE PROCESSING FUNCTIONALITY

(71) Applicant: Capital One Services, LLC, McLean, VA (US)

(72) Inventors: Keegan Franklin, Tucson, AZ (US); Aeman Jamali, Indianapolis, IN (US); Jordan Arrieta, Wilmington, DE (US); Danielle Wegrzyn, Bear, DE (US); Michael Croghan, Herndon, VA (US); Kai Si, Monterey Park, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/011,823

(22) Filed: Jan. 7, 2025

(51) Int. Cl.
  *G06T 5/80* (2024.01)
  *G06Q 40/02* (2023.01)
  *G06T 19/00* (2011.01)
  *H04N 23/63* (2023.01)

(52) U.S. Cl.
  CPC .............. *G06Q 40/02* (2013.01); *G06T 5/80* (2024.01); *G06T 19/006* (2013.01); *H04N 23/632* (2023.01)

(58) Field of Classification Search
  CPC .... G06T 5/77; G06T 5/80; G06T 7/70; G06T 19/006
  See application file for complete search history.

(56) References Cited

U.S. PATENT DOCUMENTS

| | | | |
|---|---|---|---|
| 8,638,363 B2 | 1/2014 | King et al. | |
| 9,672,510 B2 | 6/2017 | Roach et al. | |
| 9,721,177 B2 | 8/2017 | Lee et al. | |
| 10,552,810 B1 | 2/2020 | Ethington et al. | |
| 10,706,466 B1 | 7/2020 | Ethington et al. | |
| 12,020,496 B2 | 6/2024 | Roach et al. | |
| 2012/0040717 A1 | 2/2012 | Levy et al. | |
| 2022/0286656 A1* | 9/2022 | Matsuoka | G09G 5/10 |

* cited by examiner

*Primary Examiner* — Sam Bhattacharya
(74) *Attorney, Agent, or Firm* — Sterne, Kessler, Goldstein & Fox P.L.L.C.

(57) ABSTRACT

Disclosed herein are various embodiments for a camera guide alignment and auto-capture system with image processing. An embodiment operates by generating a base image of a document as displayed within a viewfinder of a camera that includes a visual guide. A tilt associated with the base image is identified. One or coordinates corresponding to a position of the visual guide are identified. A perspective correction is performed on the base image based on the coordinate(s) to generate a corrected image, in which the tilt is reduced. A preview of the corrected image is provided for display within the viewfinder. The corrected image is provided for storage or further processing.

20 Claims, 12 Drawing Sheets

CAMERA GUIDE ALIGNMENT AND AUTO-CAPTURE SYSTEM WITH IMAGE PROCESSING FUNCTIONALITY

CROSS-REFERENCE TO RELATED APPLICATIONS

This application is related to U.S. patent application Ser. No. 19/011,829, titled "Camera Guide Alignment and Check Deposit System with Text Extraction", filed herewith, which is hereby incorporated by reference in its entirety.

This application is related to U.S. patent application Ser. No. 18/503,230, titled "Burst Image Capture," filed Nov. 7, 2023, which is hereby incorporated by reference in its entirety.

BACKGROUND

More and more often people are using the cameras on their mobile phones to take pictures of documents. These pictures may then be used as the document, often in lieu of receiving the actual physical document, to perform some type of transaction, such as a financial transaction. However, many users struggle with understanding how to position their camera to capture the best picture of the document that would be usable for its intended purpose, which often results in requiring the user to take multiple pictures, and computing devices performing back-and-forth transmissions and data and image processing. If the picture is not clear enough, the image may be unusable for its intended purpose and the transaction may not be completed. The user would then have to take another picture (or set of pictures), transmit those pictures for processing, and then await the result. This process may repeat over-and-over again until a usable image is finally captured and processed, or the user simply gives up.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, of a camera guide alignment and auto-capture system.

More and more often people are using the cameras on their mobile phones to take pictures of documents. These pictures may then be used as the document, often in lieu of receiving the actual physical document, to perform some type of transaction, such as a financial transaction. However, many users struggle with understanding how to position their camera to capture the best picture of the document that would be usable for its intended purpose, which often results in requiring the user to take multiple pictures, and computing devices performing back-and-forth transmissions and data and image processing. If the picture is not clear enough, the image may be unusable for its intended purpose and the transaction may not be completed. The user would then have to take another picture (or set of pictures), transmit those pictures for processing, and then await the result. This process may repeat over-and-over again until a usable image is finally captured and processed, or the user simply gives up.

Figure 1:
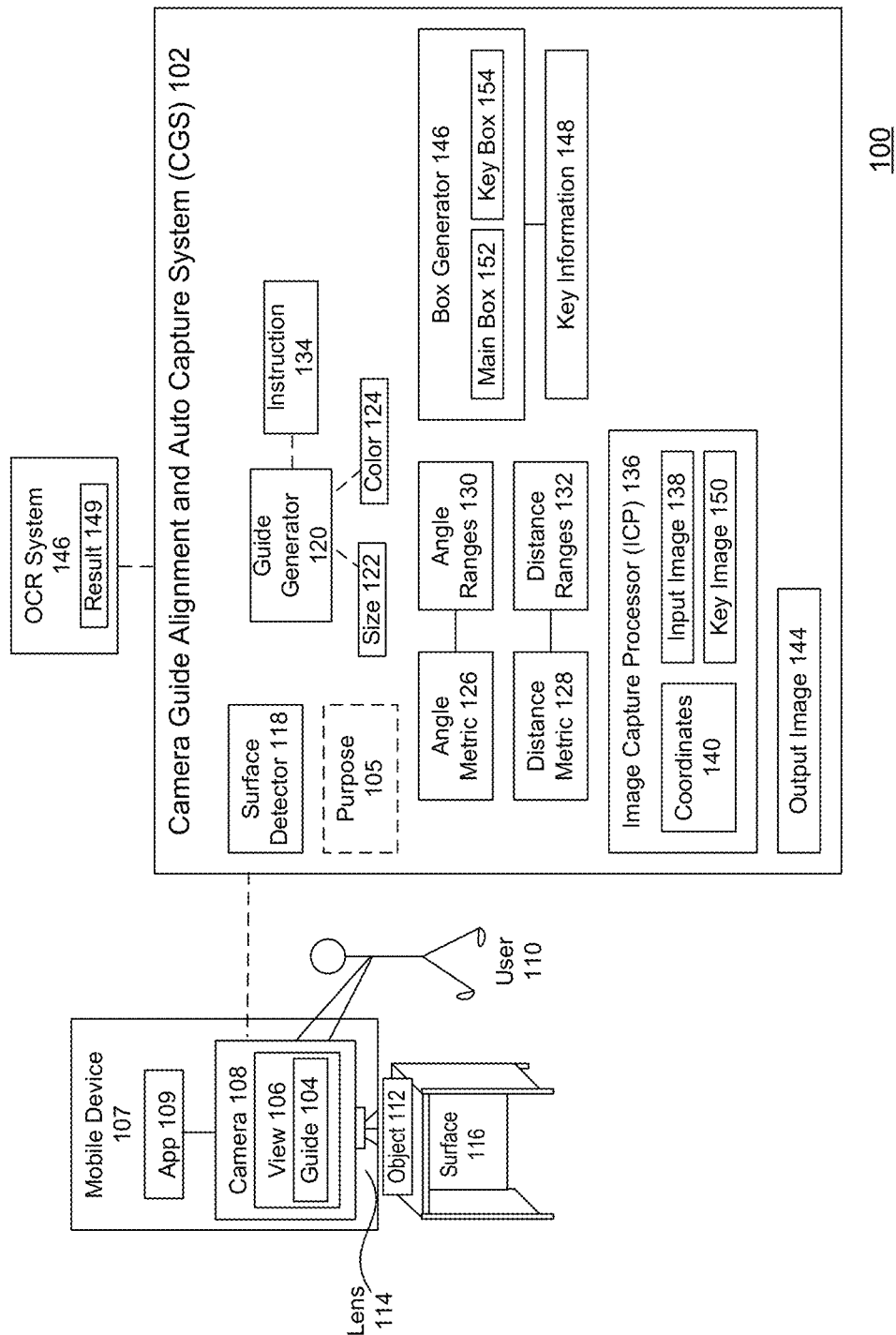
FIG. 1 is a block diagram of a camera guide alignment and auto-capture system (CGS), according to some embodiments.

FIG. 1 is a block diagram 100 of a camera guide alignment and auto-capture system (CGS) 102, according to some embodiments. CGS 102 may generate a guide 104 on a viewfinder (view) 106 of a camera 108 that helps a user 110 capture an image of an object 112. In some embodiments, the camera 108 may be integrated into a computing device such as a mobile device 107 (e.g., mobile phone or tablet or other device with a built-in camera or image capture functionality). User 110 may look through viewfinder, referred to herein as a view 106, of the camera 108 to see a document that they want captured via the camera 108. In some embodiments, the view 106 may be a screen of the mobile device 107. Through the view 106, the user 110 may see where the lens 114 (or lenses) of the camera 108/mobile device 107 is focused and what image would be captured.

Conventionally, when taking a picture, a user would just point the lens of a camera at an object and take a picture, without any indicator as to whether the picture they took is acceptable for whatever purposes they are taking the picture. The user would just take their best guess. This process however creates a lot of uncertainty, and wastes time and resources in taking a picture, or multiple pictures, sending those images to another device for processing (which wastes computing bandwidth). The other device would then try to process the image(s). And if the images are not good enough, then time, computing cycles, bandwidth, and other resources would have been wasted, and a new picture would then still be required. A user would then take new pictures and re-transmit those new pictures for processing, until one or more acceptable pictures are taken, or the user simply gives up.

CGS 102 may assist a user 110 in taking the best picture, or at least an acceptable or usable picture, of an object 112 that can be used for a particular intended purpose 105 by providing a visible guide 104 for the user 110. Purpose 105 may indicate for what reason the picture is being taken. Examples of purpose 105 may include: depositing a check, providing identification, validating a home address, providing proof of purchase or a receipt, validating a contract, etc. For example, the user 110 may be taking a picture of a check (e.g., object 112) for the purpose 105 of (remotely) depositing the check.

In some embodiments, different purposes 105 may have different requirements on the quality of picture or image that would be necessary to serve for that use, and thus CGS 102 may adjust guide 104 accordingly, based on the selected purpose 105 (as will be discussed in greater detail below). For simplicity, the examples herein will primarily focus on the user 110 taking an image of a check (e.g., object 112) for the purpose 105 of depositing the check into a financial account. The terms check and object 112 may be used interchangeably, but it is understood that object 112 is not limited to a check, and purpose 105 is not limited to depositing a check. As used herein, the terms mobile device 107 and camera 108 may also be used interchangeably. However, a mobile device may be any handheld device that includes a camera 108 or is attached to a camera 108.

In some embodiments, CGS 102 may generate a guide 104. Guide 104 may include one or more visual cues, visible within the view 106, that may guide or direct user 110 as to where to hold and how to angle the mobile device 107 to take a usable picture of the object 112. The guide 104 may assist the user 110 in taking an image that can be used for purpose 105, and provide visual indicators to the user 110, prior to taking the picture, as to whether or not the resultant image is likely to be useable for it purpose 105. In this way, the user 110 is not guessing as to whether or not the picture they are taking is good enough, but instead, through guide 104, the user 110 is receiving real-time feedback based on the position of their mobile device 107 relative to the check 112 (or other object 112) of which they are taking a picture.

It may be that a vertical angle (e.g., in which the camera 108 is positioned directly above and parallel to the document to take a picture of the document) increases the readability of the document in the image. As the angle of deviation of the camera 108 from the parallel increases, so too does the skew in the image increase, which effectively decreases the readability of the document in the image. In some embodiments, the guide 104 may direct the user 110 to position the camera 108 at the most vertical angle possible, such that the mobile device 107 is parallel to the flat surface 116 where the document 112 is placed. Guide 104 may include indicators when the angle of deviation from the vertical is too great a deviation from vertical to generate a usable or readable picture thus avoiding the user 110 taking and transmitting pictures which cannot be used. In some embodiments, guide 104 may also assist the user 110 in determining whether the distance (e.g. between the mobile device 107 or its lens 114 and surface 116 or location of object 112) is too great, too small, or within an acceptable range for an optimal or usable picture.

In some embodiments, for different objects 112 and/or different purposes 105, the angles and/or distances required for the best picture or a usable picture (as indicated by guide 104) may vary. For example, an image of a check to be deposited may include more stringent (e.g., more vertical) requirements relative to an image of a check used to validate the existence of a bank account, amount on the check, home address of the user, or another purpose 105. CGS 102 may adjust the notifications or indications provided through guide 104 (as described below) in accordance with the varying requirements for different purposes 105.

Though illustrated as a separate system communicatively coupled to mobile device 107, in some embodiments CGS 102 may be operable on the mobile device 107. For example, CGS 102 may be operable within, or at least partially operable within, an app 109 that is operating on mobile device 107. In some embodiments, at least a portion of the CGS 102 functionality, as described herein, may be accessible via the app 109 operating locally on mobile device 107. In some embodiments, at least a portion of the CGS 102 functionality, as described herein, may be accessible via a network connection, whereby additional CGS 102 functionality may be operating in a cloud computing or other network accessible computing environment. In some embodiments, app 109 may have access to the camera 108 to cause camera 108 and/or mobile device 107 to take images. In another embodiment, the camera 108 can be controlled remotely.

In some embodiments, the user 110 may open an app 109 on the mobile device 107. App 109 may have its own picture taking functionality and/or may have access the camera 108 and/or lens 114 of mobile device 107. In some embodiments, app 109 may be able to cause camera 108 to take pictures and/or mobile device 107 to take screenshots. In some embodiments, app 109 may be configured to perform image processing on the picture that is captured, as described herein.

In some embodiments, user 110 may open app 109, and see where lens 114 is pointing through view 106. In some embodiments, there may be no guide 104 initially displayed within view 106. The user 110 may point lens 114 towards a surface 116 (e.g., such as a table, chair, desk, etc.) where check 112 is placed or check 112 is intended to be placed, and may request CGS 102 to generate a guide 104 or may request CGS 102 to anchor the guide 104 to that surface 116. In some embodiments, user 110 may request CGS 102 to generate a guide 104 or anchor the guide 104 by selecting a user interface icon of app 109, or by tapping the screen of mobile device 107 while app 109 is operating.

In some embodiments, app 109 may be a remote deposit application related to depositing a check. App 109 may display a guide 104 in the field of view 108 of camera 108. Guide 104 may take the form of a check, money order, an identification document, passport, etc. App 109 may include a surface detector 118 that detect a flat surface 116 (e.g., a desktop) through the lens 114 of camera 108. In some embodiments, surface detector 118 may detect a flat surface 116 prior to receiving any user request, and if a flat surface 116 is detected for a threshold period of time (e.g., 3 seconds), a request for guide 104 may automatically be generated without user action or a specific user request for guide 104. Flat surface 116 may include any flat, horizontal surface, or predominately horizontal surface such as a desk, table, chair, etc. In some embodiments, the flat surface 116 may include a wall or floor if that is where lens 114 is projected when guide 104 is requested. In some embodiments, the user 110 may request the guide 104 once the lens 114 is focused on the surface 116 and location where the user 110 wants app 109 to anchor the guide 104. This allows for the guide to be placed where the user 110 wants it as opposed to some random service. For simplicity, in the examples described herein, the surface 116 will be presumed to be a horizontal surface such as a table or desk.

Upon detecting the surface 116 (e.g., flat surface), a guide generator 120 may generate the guide 104 to be displayed or projected in the view 106 of camera 108. The guide 104 may be positioned on the flat surface 116 in a central location of view 106 relative to when the request for the guide 104 was generated or received.

In some embodiments, the guide 104 may be anchored to the initial position on flat surface 116. This anchoring of the guide 104 may cause guide 104 to remain in a fixed location, even if the user 110 subsequently moves the mobile device 107 around the room, or points lens 114 to others surfaces. For example, the guide 104 may include an augmented reality (AR) projection of guide 104 that may only be visible through view 106. In some embodiments, the anchored guide 104 may only be visible when the user 110 points lens to or near the initial anchor location on flat surface 116, such that the initial anchor location is visible within view 106.

In some embodiments, guide generator 120 may determine or select a size 122 for the guide 104. The size 122 may include any size and/or shape configurations for guide 104. For example, size 122 may include a size of a standard personal check and may be configured based on real-world, or physical dimensions of a personal check (e.g., in inches, millimeters, etc.), instead of being sized relative to how many pixels are available or the screen size of view 104. For example, the guide 104 may be displayed in the AR space, visible through view 106, as being projected on flat surface 116 in accordance with the physical dimensions specified by size 122. As such, guide 104 may be the same size for different mobile devices 107 with different screen sizes for view 106, because the size 122 of guide 104 may be configured based on real-world or physical objects, such as the size of a physical check-which is independent of which mobile device 107 is being used.

In some embodiments, there may be multiple different sizes 122 for guide 104, such as personal check and business check (which may be a different, larger size than a standard personal check). In some embodiments, app 109 may allow user 110 to scroll or select which size 122 guide to generate, or the user 110 may select the type of document or object 112 that is being photographed and guide generator 120 may select the corresponding size 122 for guide 104. For example, a user 110 may select, via app 109, which object 112 is being captured (e.g., check, document, contract, credit card, driver license, or other physical object). Upon receiving the selection of the object 112, guide generator 120 may change the size 122 and/or shape of guide 104.

In some embodiments, the same document or object 112 may come in different sizes or shapes. For example, if a user 110 is capturing an image of a check 112, the user 110 may select the check option indicating the object 112 or document type being captured. And because checks may come in different sizes, the user 110 may then subsequently select the size 122 of the check for which the image is being captured (e.g., business or personal, or the dimensions of the check). Or for example, if the image is a document, such as a contract, user 110 may select the size of paper that is being used for the contract (e.g., standard size or legal size). In some embodiments, guide generator 120 may be configured to auto-detect the size 122 of the object 112, and generate a guide 104 or adjust the size 122 of the guide 104 accordingly.

In some embodiments, the user 110 may be able to select different shapes (e.g., circle, square, rectangle, etc.) and/or configured the size 122 of guide 104 based on their desired dimensions for guide 104, through a size selection interface of app 109 depending on the object 112 or document being photographed.

If the object 112 is a document, such as a check 112, guide 104 may be projected as a rectangular shape onto surface 116 (e.g., as visible through the AR space of view 106). As noted above, the size 122 of the guide 104 may be projected onto the surface 116 in terms of real-world or physical measurements (e.g., inches, millimeters, etc.). In some embodiments, the guide 104 may include a full outline of the rectangle in which the physical check 112 is to be placed.

In some embodiments, the guide 104 may include only a portion of the rectangle where the check 112 is to be placed. For example, the guide 104 may include four L shaped corner indicators, indicating the four corners within which the check 112 is to be placed. Or for example, the guide 104 may include two diagonally oriented corners, or a horizontal line indicating where the top or bottom of the check 112 is to be placed, or any other variations of portions of the rectangle indicating where check 112 is to be placed.

As noted above, the guide 104 may include an AR projection within view 106 that is anchored to surface 116 in a particular location (e.g., corresponding to a location where lens 114 was pointed when guide 104 was initially generated or requested). For example, if the user 110 requests guide 104 and guide is projected onto a first desk in a first location on the first desk, then even if user 110 drops their phone or moves their phone around the room to point lens 114 to a second desk, the projection of guide 104 remains fixed or anchored on the first desk.

If the user 110 wants to change the anchor location of guide 104 (e.g., to use the second desk instead of the first desk or a different spot on the first desk to take the picture), then user 110 may point lens 114 to the new location, re-request guide 104 (e.g., by tapping on the screen of the mobile device 107 or making a user interface selection), and guide generator 120 may generate, project, and anchor a new guide 104 to the new location (e.g., and replace, delete, or remove the first or initial guide projected and anchored to the first location on the first desk). In some embodiments, CGS 102 may allow a user to drag-and-drop the AR projection of guide 104 (in view 106) to any anchor location they choose within their physical environment.

Once guide 104 has been projected and anchored to a location on surface 116, CGS 102 may then prompt the user 110 or wait for the user 110 to place the check 112 (or other object 112) on the surface 116. User 110 may align or place check 112 on surface 116 within the bounds of guide 104 (as seen through view 106). In some embodiments, guide 104 may be slightly or proportionally bigger (e.g., 5% larger) than check 112 to allow the user 110 some flexibility for fitting check 112 inside guide 104. In some embodiments, if check 112 is located in a first location on surface 116 and the guide 104 is anchored to a different location within the physical environment, user 110 may move guide by pointing lens 114 to the portion of surface 116 where check 112 is placed and re-requesting guide 104 to be generated.

In some embodiments, guide generator 120 may select and/or adjust a color 124 (or colors) of the guide 104 that is being displayed in the view 106, to help the user 110 take the best picture of the object 112. In some embodiments, color 124 may be selected based on an angle metric 126 and/or a distance metric 128. Alternatively, the color 124 may be selected based on the color of the flat surface 116.

In some embodiments, the angle metric 126 and distance metric 128 may be values that are provided by or received from various sensors of mobile phone 107, which may include a proximity sensor, gyroscope, position sensor, and/or other sensors and/or functionality that are capable of calculating distance and/or angle information as described herein.

Angle metric 126 may indicate an angle between the lens 114 and the flat surface 116 where guide 104 is anchored. As noted above, in some embodiments, the best angle at which to take a picture for use, readability, optical character recognition (OCR), and/or other processing (e.g., particularly for document processing) may be 0 degrees vertical, or parallel to the surface 116 (e.g., whereby the camera 108 or lens 114 is positioned above the check 112 or other document). As such, in some embodiments, angle metric 126 may indicate an amount of deviation from a vertical angle, whereby the lens 114 is positioned directly above the projection of guide 104 on surface 116.

In some embodiments, if the lens 114 is parallel above to the anchor location of guide 104 on surface 116, the angle metric 126 may be 0 degrees. Then, for example, any deviation, in any direction from the vertical of 0 degrees above the anchored position of guide 104 may be measured by the sensors of the mobile device 108 and provided as the angle metric 126. In some embodiments, the angle metric 126 may measure the angle between the lens 114 and the position where guide 104 (e.g., either a specific corner of guide, or the center of guide) is anchored on surface 116. In some embodiments, the angle metric 116 may be a measure of verticality relative to a location on flat surface 116 where guide 104 is anchored.

In some embodiments, CGS 102 may generate or include a set of angle ranges 130 indicating whether the angle metric 126 will result in a good or usable picture of object 112. The angle ranges 130 may include various measures that indicate whether the angle metric 126 is likely to capture an acceptable or unacceptable image of object 112 (e.g., for the purpose 105). The angle ranges 130 may indicate the likelihood of usability if a picture of object 112 (as being placed within guide 104) was to be taken at that angle (e.g., between lens 114 and the projection of guide 104 on surface 116).

For example, a first angle range 130 may include values from 0-10 degrees (e.g., from vertical). A second angle range 130 may include values from 11-30 degrees. And a third angle range 130 may include values from 31-90 degrees. In this example, the first angle range 130 may be considered the best in terms of readability, usability, or picture quality, while the second angle range 130 may be acceptable, and the third angle range 130 may be the worst or unacceptable. In other embodiments, the angel ranges 130 may vary both in quantity and quality. In some embodiments, the angle ranges 130 (which may include threshold values delimiting the end/beginning of each range) may vary based on the selected purpose 105 and/or object 112 being pictured.

Distance metric 128 may include a sensor reading, indicating a distance between the lens 114 and the surface 116 (or the anchor position of guide 104 on surface 116). Similar to the angle ranges 130, distance ranges 132 may vary based on a distance between lens 114 and the anchor position of guide 104 on surface 116. For example, a first distance range 132 may be 0-6 inches which may be too close, a second distance range 132 may be 7-16 inches may be ideal, a third distance range 132 of 17-26 inches may be acceptable, and a fourth distance range 132 of 27+ inches may be unacceptable or poor. In other embodiments, different numbers of ranges with different distance metric 128 values may be used, and may vary based on the selected purpose 105 and/or selected object 112 being pictured.

In some embodiments, guide generator 120 may set, adjust, or change the color 124 of the guide 104 based on the values of the angle metric 126. For example, guide generator 120 may compare the received angle metric 126 to identify into which angle range 130 the angle metric 126 value falls. Each range of values may correspond to a different color 124. For example, green may indicate the best range, yellow may indicated a medium range, and red may indicate the worst or unacceptable range. Or for example, if angle metric 126 is "5 degrees", then guide 104 may be displayed on the view 106 in the color green if it is in the best range. But then if user 110 moves the mobile device 107 and the new value of angle metric 126 is "20 degrees", which falls in a different angle range 130, guide generator 120 may change the color to yellow.

Similar color and display processing may be done with regard to the distance metric 128. For example, each distance range 132 may be assigned a unique color. Additionally, using different colors for the guide 104 can be applied to any metric (e.g., distance, angle, focus, skew, etc.) to assist the user 110 in capturing an image.

In some embodiments, guide 104 may include two sets of colors, one for angle metric 126 and the other for distance metric 128. Then, for example, as the user 110 moves the camera 108 around, and the values for angle metric 126 and/or distance metric 128 change, and enter into new ranges 130, 132, guide generator 120 may adjust the color(s) 124 of the guide 104 accordingly.

In some embodiments, guide generator 120 may rely on values from both angle ranges 130 and distance ranges 132 to determine one color 124 to select for guide 104. For example, if the angle metric 126 is in the best angle range 130, and the distance metric 128 is a medium distance range 132, the color 124 may be yellow (e.g., using the lowest color value across both angle ranges 130 and distance ranges 132), until the distance is corrected and both the angle metric 126 and distance metric 128 are in the best or highest range.

In some embodiments, CGS 102 may provide the user 110 the option of turning off the guide 104 and only displaying the guide 104 in view 104 when one of the angle metric 126 and/or distance metric 128 are in a sub-optimal range (130, 132).

In some embodiments, guide generator 120 may generate and provide an instruction 134 for display via view 106 in addition to guide 104. Instruction 134 may be an indication to the user 110 as to how to correct the position of the mobile device 107 or lens 114 relative to the object 112 to take the best picture. In some embodiments, instructions 134 may include supplemental instructions provided in addition to guide 104.

For example, instruction 134 may be a message that reads "too close" or "move camera farther away" if the distance metric 128 is a first distance range 132 of 0-6 inches. Or, for example, the instruction 134 may indicate an arrow in which direction to move the camera 108 if the angle metric 126 is outside of the best range, or if the guide 104 is not visible in view 014. In some embodiments, instruction 134 may simultaneously display multiple instructions for correcting or improving both distance and angle. In some embodiments, instruction 134 may indicate "Angle is good. Distance is too far: Move closer to object".

In some embodiments, instruction 134 may include audible information that is provided to the user 110. For example, if the distance metric 128 is in an unacceptable distance range 132, CGS 102 may provide an audible alert telling the user to "move camera closer to object" or "move camera further away from object." Similar audible alerts may be provided with regard to angle metric 126 and angle ranges 130.

In some embodiments, an image capture processor (ICP) 136 may instruct the camera 108 to automatically capture an initial input image 138 when the angle metric 126 is in a best angle range 130 and/or the distance metric 128 is in a best distance range 132. In some embodiments, the input image 138 may be the image captured responsive to the user 110 commanding the camera 108 or app 109 to take a picture (also known as manual capture). For simplicity, the primary examples described herein refer to the input image 138 as an image captured by a camera 108. In some embodiments, the input image 138 may be a blended image, which may include using multiple images to generate a blended image. The blended image is described in greater detail in U.S. patent application Ser. No. 18/503,230, titled "Burst Image Capture," which is hereby incorporated by reference in its entirety. In short, the blended image is a synthetic image because every pixel value is the result of synthesizing pixel data across a set of captured images in order to generate an image that is different than each of the captured images. The synthetic image can be processed on the mobile device 108 or ultimately transmitted to the bank for further processing just like a captured image.

In some embodiments, ICP 136 may prompt a countdown before executing the auto-capture functionality. For example, in the view 106, ICP 136 may display "3 . . . 2 . . . 1 . . . " and then instruct the camera 108 to capture the input image 138. In some embodiments, CGS 102 may provide an audible tone or alert prior to instructing camera 108 to capture an image because the angle metric 126 and/or distance metric 128 are in acceptable or the highest ranges 130, 132. In some embodiments, the user 110 may manually cause the camera 108 to capture the input image 138 by selecting a button on the mobile device 108.

Input image 138 may be the initial captured image from camera 108. In some embodiments, the input image 138 may be or may include a screenshot of view 106. The screenshot may include a visual depiction of guide 104 on the input image 138. For example, the input image 138 may include a portion of the desk (e.g., surface 116), the check 112, and the guide 104 (in whatever color 124 existed when the image or screenshot was captured). This is illustrated and described in further detail below with respect to FIG. 2B.

In some embodiments, ICP 136 may automatically capture images through camera 108 by sending a command to camera 108 and/or may detect when a user 110 has manually commanded camera 108 to capture a picture. Input image 138 may include either an image captured by instruction of ICP 136 or an image captured by user 110 through manual instruction (e.g., pressing a button) on camera 108.

Rather than simply submitting the input image 138 for processing, ICP 136 may perform additional image processing to improve the likelihood that the image that is submitted can be processed in accordance with purpose 105 and/or improve the speed of image processing for purpose 105 once submitted.

For example, in some embodiments, ICP 136 may identify and crop out the background from the input image 138. For example, an input image 138 may include an image of a check laying on a desk. ICP 136 may identify the portions of the image corresponding to the check, and the portions of the image corresponding to the desk, and crop out the desk portion, or generate a new image with only the check portion. For example, in some embodiments, ICP 136 may crop out any portion of the input image 138 outside of the guide 104 (e.g., whichever portion of the image exists outside of guide 104 may be deemed background).

In some embodiments, ICP 136 may also correct for tilt and/or de-skew the input image 138 (e.g., before, after, or simultaneously with cropping the input image 138). For example, the user 110 may take the input image 138 at a non-parallel or with a tilt. Even if the image 138 is taken in the highest levels (e.g., in the highest vertical range) there may still be some tilt or skewing in the image that ICP 136 may correct.

For example, the ideal image may have the guide 104 appear as a rectangle, any angle skew or tilt may cause the image to appear as a trapezoid (e.g., where two short edges are not parallel to each other, with two long edges of different lengths). ICP 136 may correct for this distortion, tilt, and/or skew. This distortion may make reading the text of the input image 138 difficult, if not impossible for another processing engine or device, such as optical character recognition (OCR) system 146.

In some embodiments, if the ICP 136 detects the angle metric 136 was in the highest or best angle range 130 when the input image 138 was captured, ICP 136 may skip the tilt correction processing which may save processing time and resources. However, ICP 136 may still crop out any background portion of the image (e.g., outside of guide 104).

In some embodiments, ICP 136 may identify the coordinates 140 of the four corners (e.g., upper left, upper right, lower left, lower right) of the guide 104 that was projected when the input image 138 was captured. Take this input image 138, and only crop it to what is between these four corners. ICP 136 may then make the four corners a new output image 144 (e.g., after it has been cropped). This may return the check back to a rectangle, and make the text easier to read.

The result of the cropping, tilt correction, and/or de-skewing of ICP 136 may be to generate an output image 144. Output image 144 may include the input image 138 that has been cropped, tilt corrected, and/or de-skewed. In some embodiments, CGS 102 may provide the output image 144 to an OCR system 146 for processing in accordance with purpose 105. In some embodiments, OCR system 146 may read, evaluate, or otherwise process the output image 144 and generate a result 149.

The result 149 may be an indication as to what text was identified in output image 144 or whether the output image 144 was accepted and/or successfully processed with regard to purpose 105, or whether a new image needs to be taken. As will be described in further detail below, in some embodiments, output image 144 may not be OCR processed, but other images taken by CGS 102 may be OCR processed instead. However, output image 144 may still be submitted or used to deposit the check 112 or perform other processing associated with purpose 105.

In some embodiments, ICP 136 may identify the two-dimensional coordinates 140 of the four corners of a check within the view 106, as opposed to the three-dimensional coordinates of the AR space where guide 104 is projected. In some embodiments, a box generator 146 may generate various bounding boxes based on the coordinates 140 (corresponding to the check 112). A bounding box may be a rectangular box that encloses an object and its data points in a digital image. In some embodiments, box generator 146 may generate a main box 152 that encompasses the entire check 112 (or whatever object 112 is being photographed) based on the coordinates 140. For example, the coordinates 140 may correspond to the coordinates of the main box 152.

In some embodiments, box generator 146 may also generate one or more key boxes 154, around specific key information 148 associated with the check 112. Key information 148 may include any data from check that may undergo OCR processing or otherwise be used for additional processing. Example key information 148 includes the routing number, serial number, MICR (magnetic ink character recognition), the amount, etc. Each of the key boxes 154 may be a sub-box capturing only a specific portion of check 112, with specific key information 148. The key information 148, main box 152, and key boxes 154 are described in further detail below with regards to FIGS. 2C and 2D.

In some embodiments, the key boxes 154 may be generated within main box 152 based on percentages of the area enclosed within the four coordinates 140 of the check 112. For example, the key box for the MICR may be the bottom 15% of the check. In other embodiments, other measures may be used to determine the size and position of the key boxes. As noted above, the coordinates 140 may correspond to an (x, y) coordinate system with particular units corresponding to both the x and y values. Then, for example, a key box 154 for date information may begin at 10 units to the right from the left edge of the check, may be 8 units down from the top of the check, and may be 20 units long and 10 units wide. In some embodiments, a key box 154 may not exceed or cross the boundary of the main box 152, as corresponding to coordinates 140. In other embodiments, a key box 154 will not overlap with another key box 154.

In some embodiments, the boxes (152, 154), as generated by box generator 146, may be visible to the user 110 through the viewfinder (view 106) of the mobile device 107. For example, the user 110 may be able to visibly see the main box 152 and/or the key boxes 154 overlaid on check 112.

In some embodiments, upon receiving a command from the user 110 to take a picture of the object 112, CGS 102 may prompt user 110 to confirm whether the key boxes 154 are encapsulating the intended information from check 112. For example, the user 112 may be prompted to confirm whether the key box 154 corresponding to the amount of the check (e.g., key information 148) is actually encompassing the amount written on the physical check 112 (as may be seen through view 106). In some embodiments, the user 110 may select and readjust one or more of the key boxes 154 in the view 106, changing the size and/or location of one or more of the key boxes 154. For example, the user 110 may use drag-and-drop or pinch commands to adjust the key boxes 154. In some embodiments, each key box 154 may be colored differently and/or labeled, in view 106, to indicate what key information 148 is intended to be captured by the key box 154. In other embodiments, the main box 152 and/or key boxes 154 may not be visible to the user 110 via the view 106.

After the user 110 commands the mobile device 107 to take a picture of the check 112 (or a command is received from ICP 136), CGS 102 may cause mobile device 107 to take multiple pictures of the check 112. The first picture may be a main image. In some embodiments, the main image may be taken in lieu of the input image 138 and subsequent image processing as described above. In other embodiments, the main image may correspond to the output image 144 (e.g., whereby the input image 138 is taken and processed as described herein), which may encompass the entire check (e.g., the location within the main box 152).

Mobile device 107 may also capture one or more key images 150. Each key image 150 may correspond to the portion of check 112 visible within each key box 154. As such, a single image capture command by user 110 or ICP 136, may result in multiple images being captured, including both a larger main image of the entire check and one or more smaller key images 150 corresponding to different smaller or specific portions of the check.

In some embodiments, the image capture command (by the user 110 or the auto-capture functionality) may result in a single main image being captured as corresponding to the main box 152. As described above the main image may correspond to the input image 138 or the output image 144 which may have been de-skewed and/or tilt corrected by ICP 136. In some embodiments, similar image processing (e.g., deskewing and tilt correction) may be performed on each key image 150 by ICP 136.

In some embodiments, from the main image, CGS 102 may slice a number of key images 150 corresponding to each key box 154. In some embodiments, the generation of key boxes may be performed after user confirmation that the key boxes 154 are encapsulating the intended or corresponding key information 148. In some embodiments, there may be no user confirmation before generating the key images 150 (e.g. slices from output image 144). In an embodiment, the individual key images 150 are created by cropping the main image into multiple key images using the key box 154 to crop the image. The corners of key box 154 may be used to crop the image. Alternatively, the edges of key box 154 may be used. One advantage of slicing the check into multiple key boxes 154 is that creases, tears and other artifacts in the check may not interfere with being able to complete the remote deposit. Additionally, transmitting only the key images will allow the CGS system to use less bandwidth and will reduce latency in the transmission since less data is transmitted.

In some embodiments, either before or after post-image processing by ICP 136, the key images 150 may be displayed to the user 110, via an interface of app 109. The user 110 may then be prompted or asked to confirm whether each key image 150 encapsulates the intended key information 148 from check 112.

In some embodiments, if the user 110 indicates that a particular key image 150 does not include the proper key information 148, CGS 102 may re-display that key box 154 in view 106, and direct or request user 110 to position mobile device 107 so that the key box 154 properly encapsulates the intended key information 148. Then, upon receiving a command from user 110 to take an image, a new key image 150 corresponding to the displayed and adjusted or repositioned key box 154 may be taken (e.g., no other new images may be taken). This new key image 150 may then be used to replace the corresponding key image 150 which was previously taken and rejected by user 110. For example, if the check amount is for "1000.68" and initial key image 150 corresponding to the image reads "1000.6", the user 110 may indicate there is missing information and may adjust the key box, so a subsequent key image 150 may be taken of the full amount "1000.68".

In some embodiments, ICP 136 may convert the key image(s) 150 into a bitonal image, which may then be used for OCR processing by OCR system 146. Rather than performing general OCR processing on the entire check image, CGS 102 may perform specialized OCR processing on specific portions of the check 112, as corresponding to each key image 150. This specialized OCR processing provides advantages over general OCR processing, as described below.

For simplicity, a single OCR system 146 is illustrated in FIG. 1. However, CGS 102 may include or have access to multiple specialized OCR systems 146, each OCR system 146 being specifically trained to extract specific key information 148 from one of the key images 150. Using several smaller specialized OCR systems 146 to process smaller key images 150, improves processing speed, accuracy, and throughput, relative to using a general OCR system for processing an image of the entire check. There is less information input into each specialized OCR system 146, and more specialized training, each OCR system 146 produces a faster and more accurate result 149. This type of improved processing may not be possible without the generation of key images 150.

Result 149 may include the output from OCR processing, which may include the text, symbols, or other characters identified in each key image 150.

One of the disadvantages of general OCR processing of an entire check image is that if there is damage to a portion to a check (e.g., a rip, tear, fold, stain, extraneous markings, etc.), this type of damaged check would often fail using general OCR processing due to it damage. However, CGS 102 allows for damaged checks, which may not be suitable for general OCR processing, to undergo specialized OCR processing. For example, the key images 150 may focus on specific key information 148 portions of the check 112, so as long as the damage has not caused the key information 148 itself to become unreadable, the damaged check may be automatically processed by CGS 102. For example, a check that has a tear in it or a fold in it, could not be processed by a general OCR system, but may be processed by CGS 102.

Further, there are security advantages to the specialized OCR processing of CGS 102. Rather than saving an image of the entire check, which would be necessary for general OCR processing, CGS 102 only captures key information 148 in separate key images 150. An image of the entire check necessarily exposes all the personal and identifying information of the check and ties all the information together, making it easier for a hacker or other person who gains unauthorized access to get the information about the issuer of the check. By taking various smaller key images 150, CGS 102 necessarily excludes taking any image of the personal or identifying information on the check (which may not be part of the key information 148).

Further, each file corresponding to each key image 150 may be individually stored. For example, if an unauthorized user gains access to a store of key images 150, there would be no information linking a first key image 150 including an account number from a first check to a second key image 150 including a routing number from the same first check. Further, there may be no key images of personal information such as the person's name and address of who issued the check.

Figure 2A:
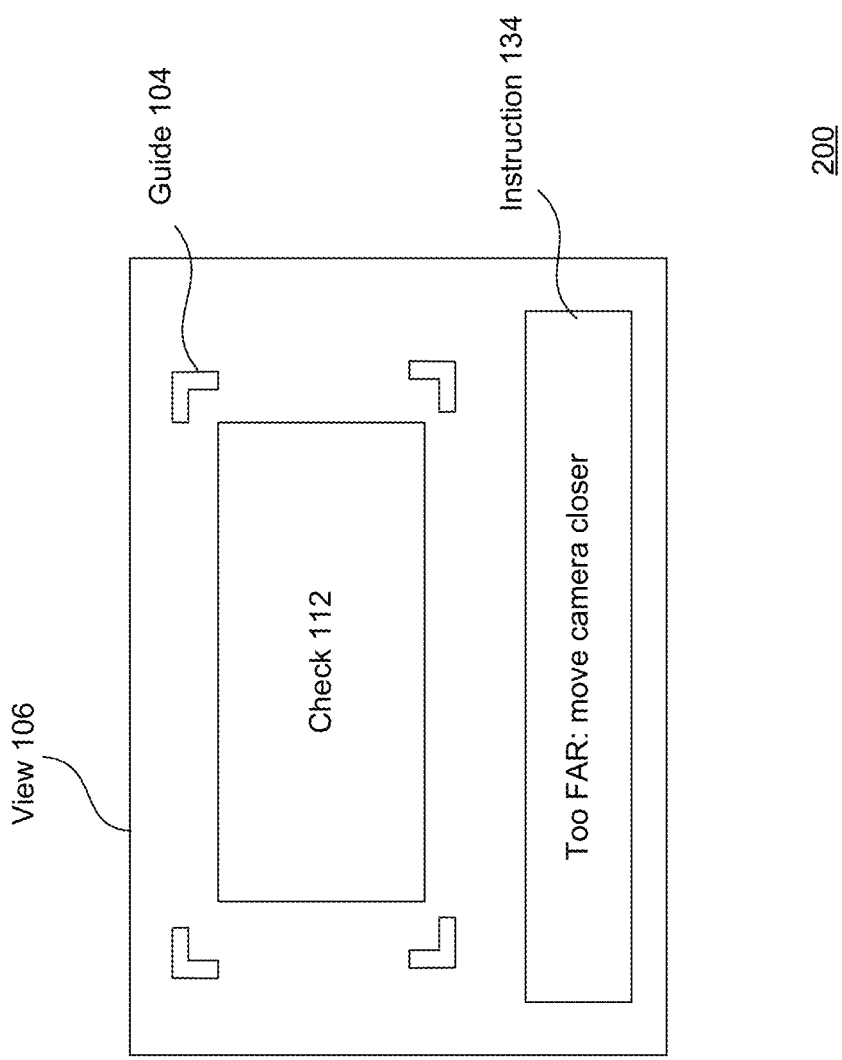
FIG. 2A illustrates an example diagram illustrating a view of a camera guide alignment and auto-capture system (CGS), according to some example embodiments.

FIG. 2A illustrates an example diagram 200 illustrating the a view 106 of a camera guide alignment and auto-capture system (CGS) 102, according to some example embodiments. Diagram 200 illustrates what a user 110 may see through the view 106 of a camera 108 or app 109 operating on mobile device 107.

In the example illustrated, guide 104 may include four corner markers for where check 112 is to be aligned. In other embodiments, guide 104 may include different markers corresponding to the rectangle, such as an outline of the rectangle, two opposing corners, a line indicating where the top or bottom of the check is to be placed, etc. Check 112 is an example of an object 112 of which a picture is to be taken by camera 108 for a particular purpose 105 (e.g., depositing the check). As described herein an image or picture may be taken of the front and/or back of the check 112.

In some embodiments, distance ranges 132 may indicate that the optimal distance to take an image is between 18-24 inches away from the check 112. As illustrated, the check 112 may not be aligned with the guide 104. CGS 102 may determine that the distance metric 128 is 36 inches, which is an unacceptable or sub-optimal distance range 132 relative to the 18-24 inches. As such, CGS 102 may generate an instruction 134 that may be displayed in view 106 and/or provided audibly to the user 110, instructing the user that the camera 108 (or mobile device 107) is too far from the surface 116 (e.g., surface where guide 104 may be anchored).

In some embodiments, the color 124 of the guide 104 may be displayed as red indicating the image is not aligned properly due to the distance metric 128 and/or angle metric 126 being in sub-optimal ranges (132, 130). This color adjustment may be provided via the four corners of guide 104 in addition to or in lieu of providing a specific instruction 134 to the user 110 as to what to do (e.g. move the camera closer or further away, or change the angle of the camera). In some embodiments, if the color of the guide 104 is red (e.g., if the angle range 130 and/or distance range 132 is in an unacceptable or poor picture quality range), then CGS 102 may not allow user 110 to take a picture until the range is at least in a yellow or acceptable range for one or both of angle metric 126 and distance metric 128.

As noted above, the guide 104 may be an augmented reality (AR) projection onto the physical surface 116 identified by surface detector 118. As such, even as the user 110 moves the camera 108, the size and location of the guide 104 may remain in a fixed location on surface 116, allowing the user to adjust the angles and distance of the camera 108 without worrying about the guide 104 moving or changing locations.

In some embodiments, the user 110 may manually request that the guide 104 be updated and re-centered within the view 106 if the user wants to anchor guide 104 to a new location. For example, if the user 110 initially points the camera to a first portion of a table (e.g., surface 116) but the check 112 is located on a second portion of the table, rather than moving the check 112 into the frame, the user 110 may relocate the camera 108 closer to the check 112 and then request that the guide 104 be re-projected and centered into the current view 106 onto the flat surface 116. The user 110 may then adjust the check 112 to fit within the new or re-projected guide 104 and/or adjust the camera 108 according to the guide 104 to take a usable picture of the check 112.

In some embodiments, with auto-capture functionality, CGS 102 may update instruction 134 to indicate when an image is about to be captured by camera 108 (e.g., by providing a countdown or timer) and/or may indicate when an image has been auto-captured.

Figure 2B:
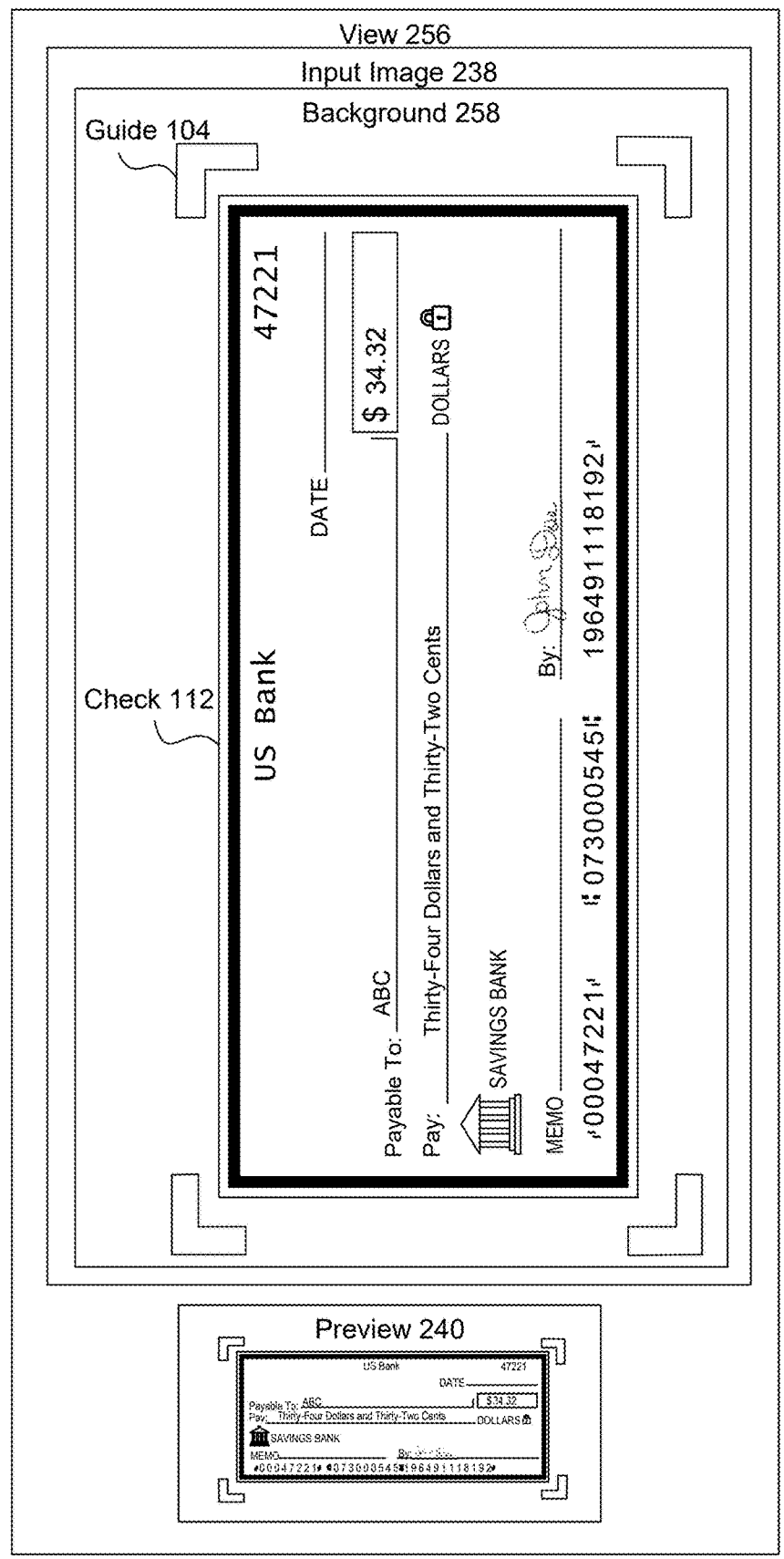
FIG. 2B illustrates an example diagram illustrating the capture and image processing of a camera guide alignment and auto-capture system (CGS), according to some example embodiments.

FIG. 2B illustrates an example diagram 220 illustrating the capture and image processing of a camera guide alignment and auto-capture system (CGS) 102, according to some example embodiments.

As illustrated in view 256 (which may be an example of view 106), the user 110 or CGS 102 may have caused camera 108 to capture input image 238 (which may be an example of input image 138).

In some embodiments, the input image 238 may be a screenshot of what was displayed on view 256, as the input image 238 may include the projected AR guide 104 within the captured image. The color of the guide 104, indicating the amount of angle and/or distance, may also have been captured and may be visible in the original input image 238. The input image 238 may also include background 258 around the check 112. The background 258 may include the desk or other surface 116 that the check 112 was placed on, and any other objects which may have been viewable in view 256 when the input image 238 was captured (e.g. such as pencils, pens, etc.). In some embodiments, background 258 may include any portion of the input image 238 outside of the guide 104.

After capturing or receiving input image 238, ICP 136 may perform additional processing to improve the quality of the image 238. This additional processing may include performing a cropping operation (e.g., to remove background 258), correcting for tilt, and/or performing de-skewing. In some embodiments, these operations may be performed simultaneously or substantially simultaneously with each other. The resultant image may be a newly generated image displayed in preview 240. As illustrated, in some embodiments, preview 240 may include the guide 140 which corresponds to the four corners of the preview 240, and the guide 104 may be visible in the preview 240. In some embodiments, the guide 104 may be removed from the image provided in preview.

In the example illustrated, even though the input image 238 may be vertically aligned, the new image generated from the input image 238 and displayed in preview 240 may be rotated and horizontally aligned. As illustrated, both the input image 238 and preview 240 may be displayed and viewable to the user 110 simultaneously.

In some embodiments, CGS 102 may use edge detection technology or functionality to crop the background 258 out of the input image as part of generating the new image illustrated in preview 240. In some embodiments, the image displayed in preview may be a modified version of the same file of input image 238, which may consume fewer memory resources than generating a new image. In some embodiments, the image processing described herein (e.g., cropping, de-skewing, tilt correction) may be performed in memory.

Upon the display of preview 240, the user 110 may have the option to either accept or reject the image in preview 240. If the user 110 rejects the preview 240, then the user 110 may take a new image or be prompted to take a new image. If the user 110 accepts the preview 240, or does not respond within a time threshold which may be interpreted as an acceptance, then the generated image corresponding to preview 240 (e.g., the output image 144) may be submitted for further processing. In some embodiments, after acceptance of the preview, the area inside of the guide 104 (if still visible) may be cropped out and submitted for processing (e.g., such that the final or output image 144 does not include the guides 104 as being visible). In other embodiments, the output image 144 may be the same image that was displayed in preview 240.

As described above with respect to FIG. 1, the further processing may include generating key images 150 with regard to key information 148, converting the key images 150 into bitonal images, and performing OCR processing with one or more specialized OCR systems 148 on the bitonal key images 150. In some embodiments, these results 148 of the OCR processing may be provided with the output image 144 to another computing device for remote check deposit of the check 112.

Figure 2C:
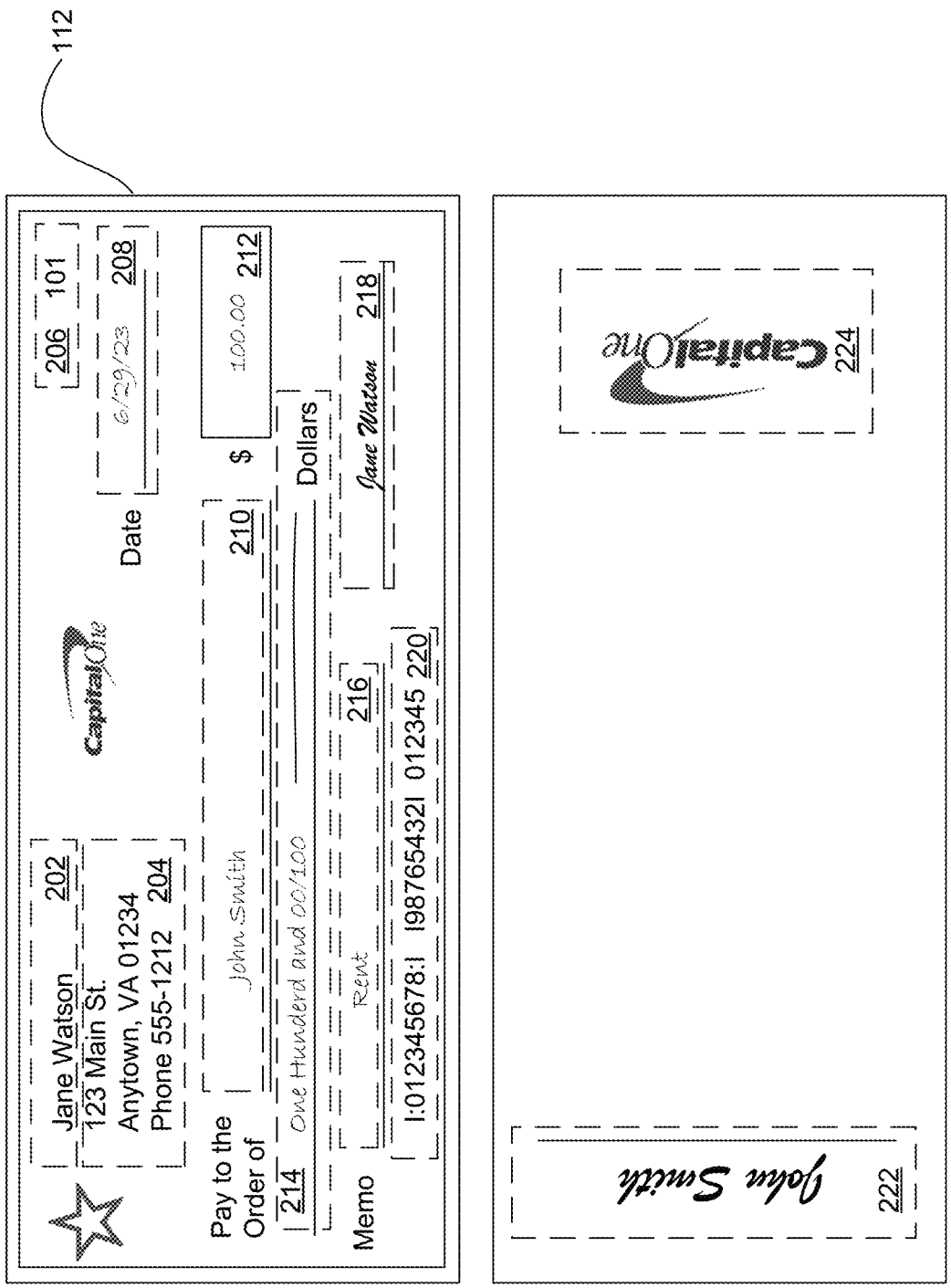
FIG. 2C illustrates example remote deposit OCR segmentation, according to some embodiments and aspects.

FIG. 2C illustrates example remote deposit OCR segmentation, according to some embodiments and aspects. Depending on check type, a check 112 may have a fixed number of identifiable fields. For example, a standard personal check may have front side fields, such as, but not limited to, a payor customer name 202 and address 204, check number 206, date 208, payee field 210, payment amount 212, a written amount 214, memo line 216, Magnetic Ink Character Recognition (MICR) line 220 that includes a string of characters including the bank routing number, the payor customer's account number, and the check number, and finally, the payor customer's signature 218. Back side identifiable fields may include, but are not limited to, payee signature 222 and security fields 224, such as a watermark. A subset of these fields may be identified as key information 148, as described above.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, the remote deposit feature in the mobile banking app 109 running on the mobile device 107 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one embodiment, active OCR processing of a live video stream of check imagery may include implementing instructions resident on the customer's mobile device to process each of the field locations on the check as they are detected or systematically (e.g., as an ordered list extracted from a byte array output video stream object). For example, in some aspects, the video streaming check imagery may reflect a pixel scan from left-to-right or from top-to-bottom with data fields identified within a frame of the check as they are streamed. The active OCR may also be applied to the data with key boxes 154.

In some aspects, the technology disclosed herein implements "Active OCR" as further described in U.S. application Ser. No. 18/503,778, entitled "Active OCR," filed Nov. 7, 2023, and incorporated by reference in its entirety. Active OCR includes performing OCR processing on image objects formed from a raw live video stream of image data originating from an activated camera on a client device. The image objects may capture portions of a check or an entire image of the check. As a portion of a check image is formed into a byte array, it may be provided to the active OCR system to extract any data fields found within the byte array in real-time or near real-time. In a non-limiting example, if the live video streamed image data contains an upper right corner of a check formed in a byte array, the byte array may be processed by the active OCR system to extract the origination date of the check.

In one non-limiting example, the customer holds their smartphone over a check (or checks) to be deposited remotely while the live video stream imagery may be formed into image objects, such as, byte array objects (e.g., frames or partial frames), ranked by confidence score (e.g., quality), and top confidence score byte array objects sequentially OCR processed until data from each of required data fields has been extracted as described in U.S. application Ser. No. 18/503,787, entitled Burst Image Capture, filed Nov. 7, 2023, and incorporated by reference in its entirety herein. Alternatively, the imagery may be a blend of pixel data from descending quality image objects to form a higher quality (e.g., high confidence) blended image that may be subsequently OCR processed, as per U.S. patent application Ser. No. 18/503,799, filed Nov. 7, 2023, entitled Intelligent Document Field Extraction from Multiple Image Objects, and incorporated by reference in its entirety herein.

In another non-limiting example, fields that include typed information, such as the MICR line 220, check number 206, payor customer name 202 and address 204, etc., may be OCR processed first from the byte array output video stream objects, followed by a more complex or time intensive OCR process of identifying written fields, which may include handwritten fields, such as the payee field 210, signature 218, to name a few. As described above, this OCR processing may include the processing of key images 150.

In another example embodiment, artificial intelligence (AI), such as machine-learning (ML) systems may train a confidence model (e.g., quality confidence) to recognize quality of a frame or partial frame of image data, or an OCR model(s) to recognize characters, numerals or other check data within the data fields of the video streamed imagery. The confidence model and OCR model may be resident on the mobile device and may be integrated with or be separate from a banking application (app). The models may be continuously updated by future images or transactions used to train the model(s).

ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific process to capture relationships between concepts (e.g., image clarity vs. recognition of specific characters or numerals) and a success history. The classifier (discriminator) is trained to distinguish (recognize) variations. Different variations may be classified to ensure no collapse of the classifier and so that variations can be distinguished.

In some aspects, machine learning models are trained on a remote machine learning platform using other customer's transactional information (e.g., previous remote deposit transactions). For example, large training sets of remote deposits with check flipping imagery may be used to normalize prediction data (e.g., not skewed by a single or few occurrences of a data artifact). Thereafter, a predictive model(s) may classify a specific image against the trained predictive model to predict an imagery check position (e.g., front-facing, flipped, back-facing) and generate a confidence score. In one embodiment, the predictive models are continuously updated as new remote deposit financial transactions or check flipping imagery become available.

In some aspects, a ML engine may continuously change weighting of model inputs to increase customer interactions with the remote deposit procedures. For example, weighting of specific data fields may be continuously modified in the model to trend towards greater success, where success is recognized by correct data field extractions or by completed remote deposit transactions. Conversely, input data field weighting that lowers successful interactions may be lowered or eliminated.

Figure 2D:
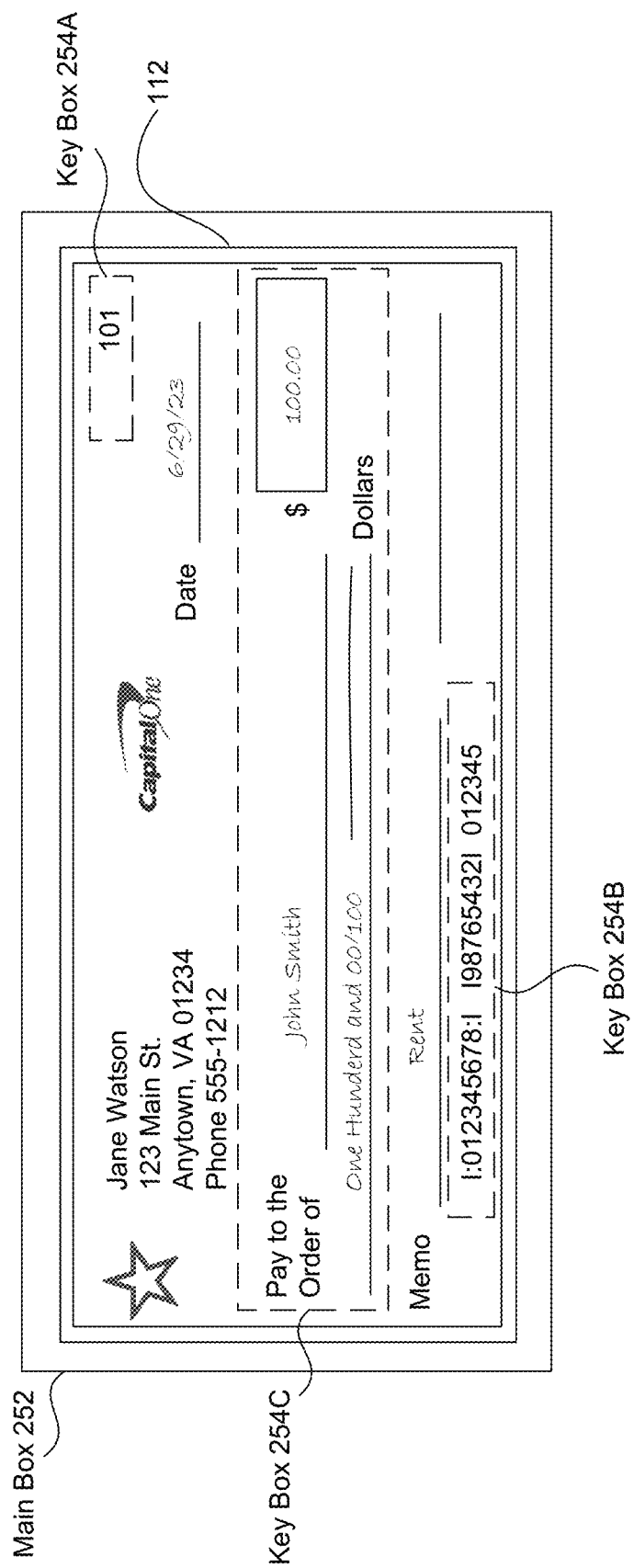
FIG. 2D illustrates an example diagram illustrating a check with a main box and key boxes as generated by the capture and image processing of a camera guide alignment and auto-capture system (CGS), according to some example embodiments.

FIG. 2D illustrates an example diagram 260 illustrating a check 112 with a main box 252 and key boxes 254A-C as generated by the capture and image processing of a camera guide alignment and auto-capture system (CGS) 102, according to some example embodiments.

As described above, with respect to FIG. 1, box generator 146 may generate a main box 152 which is illustrated as box 252 of FIG. 2D. The main box 252 may encapsulate the entire check 112. For the sake of clarity, the main box 252 is illustrated as being larger than the check 112, however in some embodiments, the main box 252 may be aligned around the edges of check 112 using edge detection technology.

FIG. 2D also illustrates several dashed line boxes corresponding to key boxes 254A-C. Each key box 254 may be directed to capturing a specific piece or pieces of key information 148. As illustrated, the key boxes 254A-C may not capture personal identifiable information such as the name, address and phone number of the issuer. In some embodiments, the key boxes 254A-C may be slices of the main box, and these slices may correspond to the key images 150 described above. In another embodiment, the check image may be divided into segments (e.g., 4, 6 or 8) and each segment can be processed separately.

Figure 3:
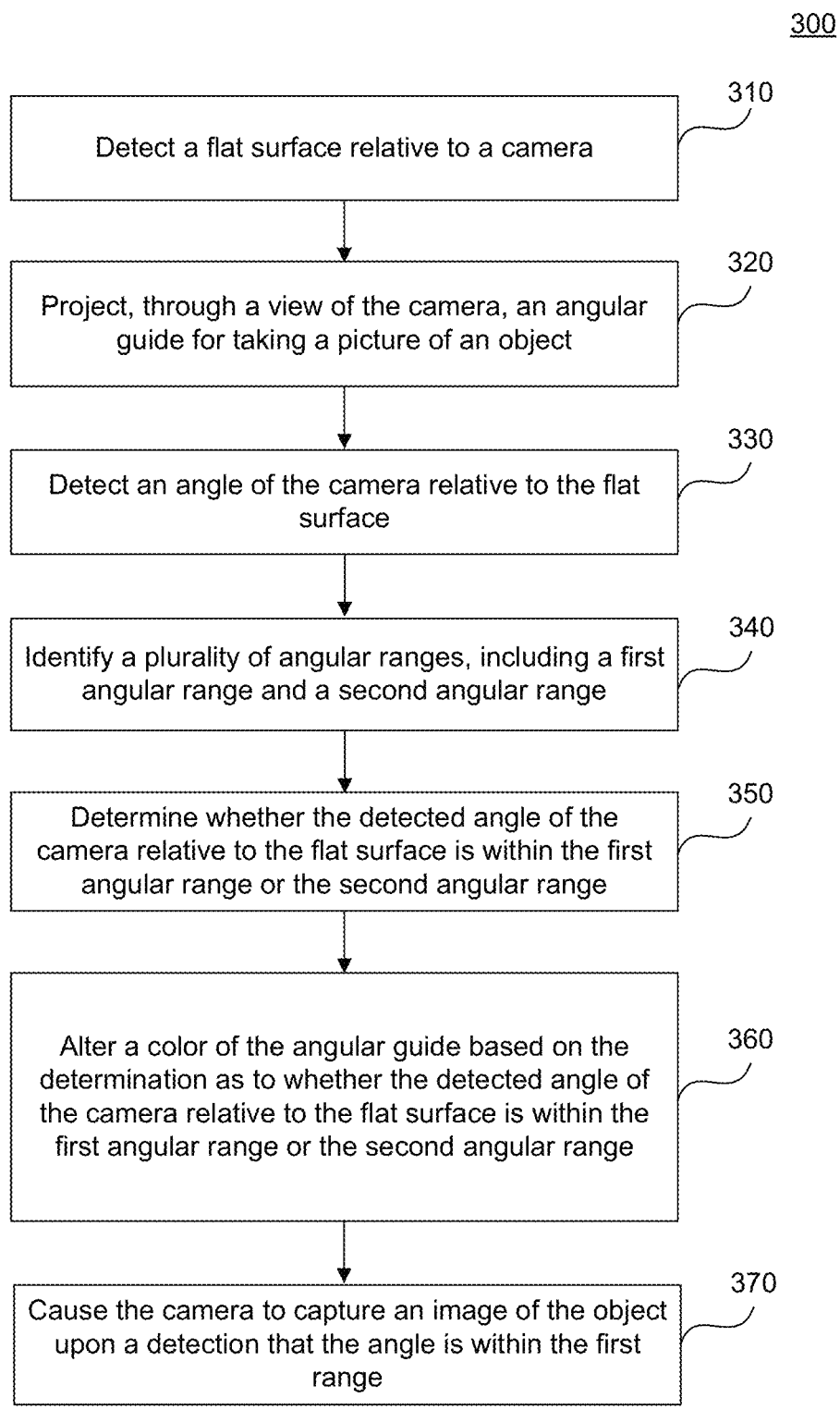
FIG. 3 is a flowchart illustrating example operations of a camera guide alignment and auto-capture system (CGS), according to some embodiments.

FIG. 3 is a flowchart 300 illustrating example operations of a camera guide alignment and auto-capture system (CGS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Without limiting method 300, method 300 is described with reference to elements in FIG. 1.

At 310, a flat surface is detected relative to a camera. For example, user 110 may point a lens 114 of mobile device 107 at a desk, table, chair, or other flat surface 116 in their physical environment and request that CGS 102 generates a guide 104. For example, the request may come in the form of selecting an option on an app 109 or tapping a touch screen of the mobile device 107. Surface detector 118 may detect the flat surface 116 of the desk, table, chair, etc., or the dominant flat surface that may be visible through lens 114. Upon detection of the flat surface, a guide generator 120 may generate a guide 104 configured to provide the user 110 with guidance on taking a high quality picture of an object 112, such as a check or other document which may be laying on the flat surface. In some embodiments, the user 110 may select which document or object 112 they are taking a picture of and for what purpose 105 the picture is being taken.

In some embodiments, upon opening app 109, app 109 may automatically generate a guide 104. Then, for example, the user may select a location on a flat surface 116 (e.g., by pointing the lens 114 to that location as may be seen through view 106), and request that the guide 104 is anchored to that location. The request for anchoring the guide 104 may be made through tapping the screen of the mobile device 107, or through a user interface of app 109. In some embodiments, if lens 114 is directed to the same location for a threshold period of time (e.g., 3 seconds), app 109 may automatically anchor the guide 104 to that position.

At 320, an angular guide for taking a picture of an object is projected through a view of the camera. For example, guide generator 120 may generate guide 104 that is visible to user 110, through view 106 of the of the camera 108 or mobile phone 107. In some embodiments, the guide 104 may be an AR projection that is anchored in a single position on surface 116 (e.g., the flat surface of a desk, chair, table, etc.). This anchoring of the guide 104 may cause the guide 104 to remain fixed in the anchored position, such that even if user 110 moves the mobile device 107 around the room and lens 114 is focused on other objects or flat surfaces (e.g., walls, ceiling, floor, other tables or chairs, etc.), the guide 104 remains fixed in its initial anchored position on surface 116. For example, if the user points lens 114 to the ceiling, the guide 104 may not be visible. But when the user 110 points lens 114 back to the area on surface 116 where the guide 104 was originally projected, then guide 104 may be visible in view 106 again.

In some embodiments, if the guide 104 is not visible in view 106 (e.g. because the user 110 is pointing the lens 114 in the wrong direction), CGS 102 may generate an instruction 114, which is viewable on view 106 directing user 110 to the location where guide 104 was anchored. For example, instruction 134 may include double arrows pointing to the direction of the guide 104. Once guide 104 is visible in view 106, the instruction 134 may no longer be displayed in view 106. Alternatively, CGS 102 may provide a suggestion-written or audio—that the guide be moved to a different location.

At 330, an angle of the camera relative to the flat surface is detected. For example, mobile device 107 may include one or more sensors that are able to detect an angle metric 126 indicating an angle between lens 114 and surface 116. In some embodiments, the angle metric 126 may be a measure of verticality between lens 114 and surface 116 (e.g., whereby greater verticality corresponds to a higher picture quality of an object 112, such as a check or other document).

At 340, a plurality of ranges are identified, including a first angular range and a second angular range. For example, angle ranges 130 may include a subset of ranges for the angle metric 126 that indicate when an acceptable or unacceptable picture is likely to be taken, or may indicate relative quality of a picture of object 112 if it was to be taken from the current position of the mobile device 107 relative to the guide 104 (which may have been anchored to surface 116 where the object 112 is placed). In some embodiments, the angle ranges 130 may indicate good, medium, bad based on the value of angle metric 126.

At 350, it is determined whether the detected angle of the camera relative to the flat surface is within the first angular range or the second angular range. For example, CGS 102 may receive the angle metric 126 from one or more sensors of mobile device 107 indicating a detected angle between lens 114 (of camera 108) and surface 116. CGS 102 may then identify to which angle range 130 the angle metric 126 corresponds.

As noted above, the more vertical the angle metric 126 may correspond to a higher quality picture, with regard to the angle ranges 130. For example, if vertical is measured at 90 degrees, then a first angle range between 90-80 degrees may correspond to a higher picture quality than a second angle range of 79-60 degrees which may correspond to a lower picture quality. If the angle metric 126 is 78 degrees, CGS 102 may determine that the angle metric 126 falls within the second, lower range (of 79-60 degrees). As used herein, the term vertical may refer to a position of the camera 108 as being parallel to the flat surface 116 where the guide 104 is anchored (e.g., the object 112 is placed), and being directly above the location on the flat surface 116 where the guide 104 is anchored. The angle metric 126 may measure any deviation from this vertical position.

At 360, a color of the angular guide is altered based on the determination as to whether the detected angle of the camera relative to the flat surface is within the first angular range or the second angular range. In some embodiments, CGS 102 may adjust or change the color of the guide 104 (or visual characteristics) based on a detected angle metric 126 (and/or distance metric 128) between lens 114 and surface 116. As user 110 moves the location of phone or mobile device 107, the color of the guide 104 may change in accordance with the new angle metrics.

For example, each angle range 130 may correspond to a different color 124. For example, good may be green, medium may be yellow, and bad may be red. Or if there are only two ranges, then the colors may be green and yellow or green and red. Then, for example, based on the angle metric 126, and its corresponding angle range 130, guide generator 120 may change the color 124 of the projected guide 104.

If the user adjusts the position of the mobile device 107, which changes the angle metric 126, the color may be adjusted accordingly. In continuing the example above, if the user moves the mobile device 107 such that the angle metric 126 is increased from 78 degrees to 82 degrees, then when CGS 102 detects that angle metric 126 crosses from 79 degrees to 80 degrees or greater, the color 124 of the guide 104 may be changed from yellow to green. In some embodiments, CGS 102 may provide an instruction 134 directing the user how to adjust the position of the mobile device 107 to take a higher quality picture (e.g., if the angle metric 126 and/or distance metric 128 is in a lower picture quality range).

At 370, the camera is caused to capture an image of the object upon a detection that the angle is within the first range. For example, in some embodiments, upon detecting that the angle metric is in a good range (or the best angle range 130 with a highest picture quality) for a predetermined period of time, ICP 136 may cause the camera 108 to take an image or screenshot of the view 106. In some embodiments, CGS 102 may provide an instruction 134 to the user 110 to take the image. In some embodiments, instruction 134 may include a visual instruction as may be seen through view 106 and/or an audible instruction such as a beep indicating that a high quality picture can be taken.

The result of taking the image (by user 110 or auto-capture by CGS 102) may be that an input image 138 is captured. In some embodiments, the input image 138 captured by app 109 may include a screenshot of whatever is visible through view 106, such that guide 104 is also visible in the input image 138. In some embodiments, app 109 may cause the mobile device 107 may take a regular picture (e.g., as opposed to a screen shot), in which guide 104 is not visible in the input image 138. However, the input image 138 may still be tilt corrected, cropped, and/or deskewed as described herein. As described in further detail below with regard to FIG. 4, ICP 136 may perform additional processing, such as correcting for tilt, cropping, and/or deskewing to generate an output image 144.

In some embodiments, the output image 144 may be provided to an OCR system 146 for processing. In other embodiments, output image 144 (which may correspond to a main image corresponding to a main box 152) may be sliced into smaller key images 150. Then, each key image 150 may be provided for OCR processing, instead of the output image 148. Using key images 150 for OCR processing may provide additional security, as personal identifying information visible on the check 112, may be excluded from the key images 150 which may be focused on capturing designated key information 148. In some embodiments, the output image 148 may then be submitted for performing remote check deposit without OCR processing on the output image 148, which may have been bypassed through the use of key images 150.

Figure 4:
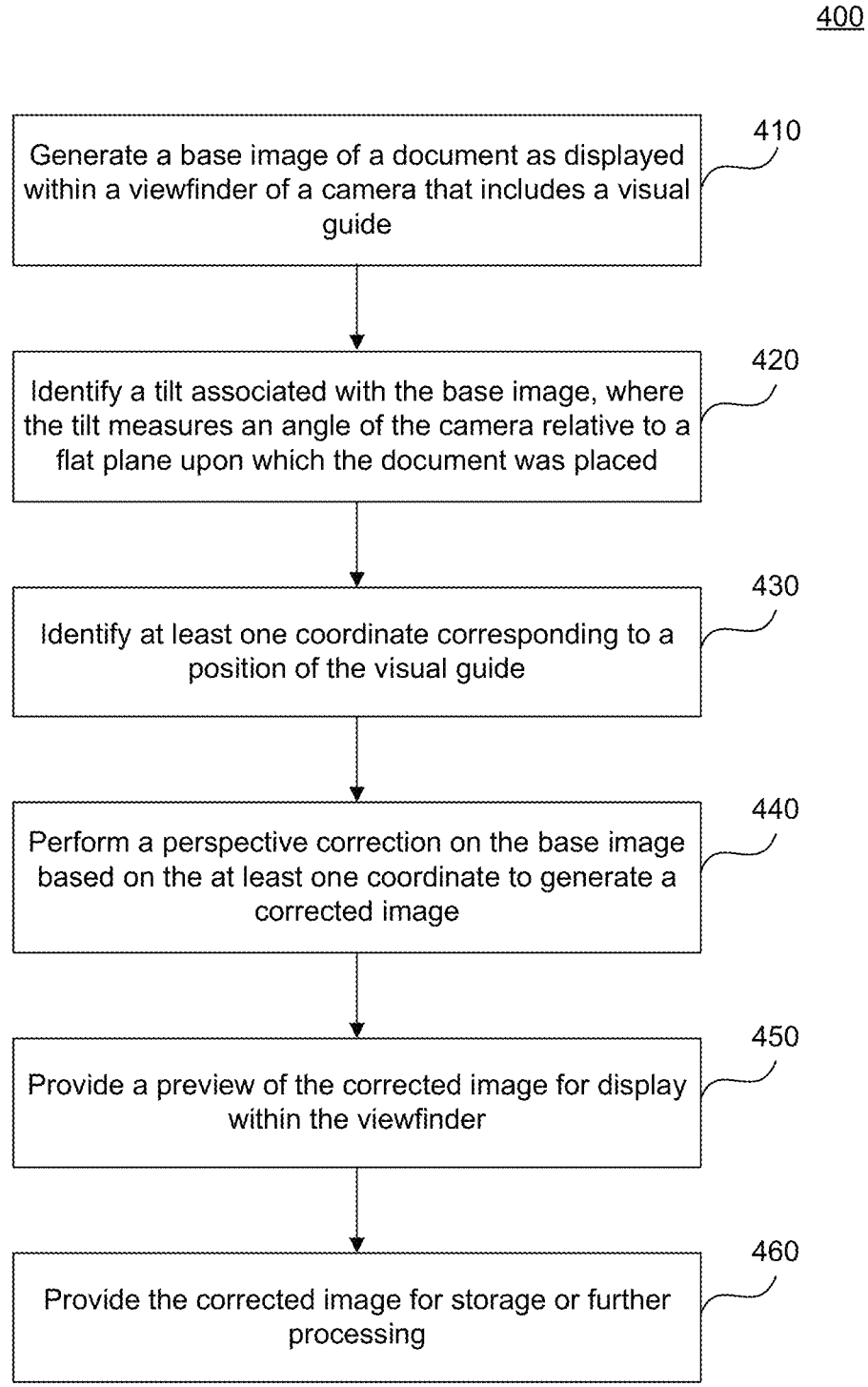
FIG. 4 is a flowchart illustrating example operations of a camera guide alignment and auto-capture system (CGS) with image processing functionality, according to some embodiments.

FIG. 4 is a flowchart 400 illustrating example operations of a camera guide alignment and auto-capture system (CGS) 102 with image processing functionality, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Without limiting method 400, method 400 is described with reference to elements in FIG. 1.

At 410, a base image of a document, as displayed within a viewfinder of a camera that includes a visual guide, is generated. In some embodiments, the base image could either be an image captured by a camera, or may be a synthetic image that is generated using blended pixel techniques (as described above). With respect to the image capture embodiment, ICP 136 may receive input image 138 as a result of user 110 taking an image of object 112 through app 109 (or app 109 automatically capturing an image based on guide 104 being aligned with a high quality picture as described above). In some embodiments, ICP 136 may be integrated into app 109 or communicatively coupled with app 109 over one or more networks. In some embodiments, ICP 136 may be organized in a cloud computing environment.

At 420, a tilt associated with the base image is identified, where the tilt measures an angle of the camera relative to a flat plane upon which the document was placed. For example, the angle metric 126 may measure the tilt or deviation from vertical of the camera 108 or lens 114 relative to the position on surface 116 where the AR guide 104 was anchored in view 106 at the time the input image 138 is captured. In some embodiments, the angle metric 126 may indicate a deviation from vertical (e.g., the lens 114 being positioned directly above or vertically above guide 104, whereby the object 112 may be placed within the bounds of the guide 104), as visible through view 106.

At 430, at least one coordinate corresponding to a position of the visual guide is identified. For example, ICP 136 may identify a set of one or more coordinates 140 (or coordinate pairs) corresponding to the guide 104 in the three-dimensional augmented reality space of view 106. The coordinates 140 may include the coordinates of the bounds or four corners of guide 104. In some embodiments, CGS 102 may receive coordinates 140 for a single corner of guide 104, and may derive any remaining coordinates 140 or the bounds of guide 104 based on size 122.

In some embodiments, CGS 102 may perform one or more transformations to translate or convert the original three-dimensional coordinates 140 (x, y, z) of the AR space where guide 104 was originally displayed, into the two-dimensional coordinates 140 (x, y) of the input image 138. In some embodiments, CGS 102 may also adjust for scale between the coordinate systems, to identify the final set of coordinates 140 for input image 138. In FIG. 1, coordinates 140 may represent both initial coordinates of a three dimensional AR space) and/or transformed coordinates (of a two dimensional space of view 106 or input image 138).

At 440, a perspective correction on the base image is performed based on the at least one coordinate to generate a corrected image. For example, ICP 136 may perform perspective correction on the input image 138. As illustrated in FIG. 2B, in some embodiments, the perspective correction may include cropping a background 216 portion of the image residing outside of the bounds of the coordinates 140 (which may correspond to guide 104). ICP 136 may also simultaneously or subsequently perform a tilt correction, rotation, and/or de-skewing of image (including the cropping) to generate an output image 144. In some embodiments, the output image 144 may be a new version of the original input image 138.

At 450, a preview of the corrected image is provided for display within the viewfinder. For example, as illustrated in FIG. 2B, CGS 102 may provide output image 144 to user 110 via in a preview 240 simultaneously with the original or input image 238. The user 110 may then have the option to accept or reject the output image 144 before it is provided for additional processing, remote deposit, transfer to another computing device, or storage.

At 460, the corrected image is provided for storage or further processing. For example, CGS 102 may provide the output image 144 to OCR system 146 for additional processing, and may receive a result 149 that may be communicated to user 110 through app 109 indicating whether the processing of output image 144 was successful. In some embodiments, the additional processing may include depositing a check, as described herein. As noted above, in some embodiments, the output image 144 may not be used for OCR processing itself, but instead, key images 150 (including key information 148) may be sliced from the output image 144, and the key images 150 may be provided for OCR processing. However, the output image 144 may still be used for remote check deposit. In some embodiments, the output image 144 may be provided with the key information 148 extracted via the OCR processing of key images 150 for the remote check deposit.

Figure 5:
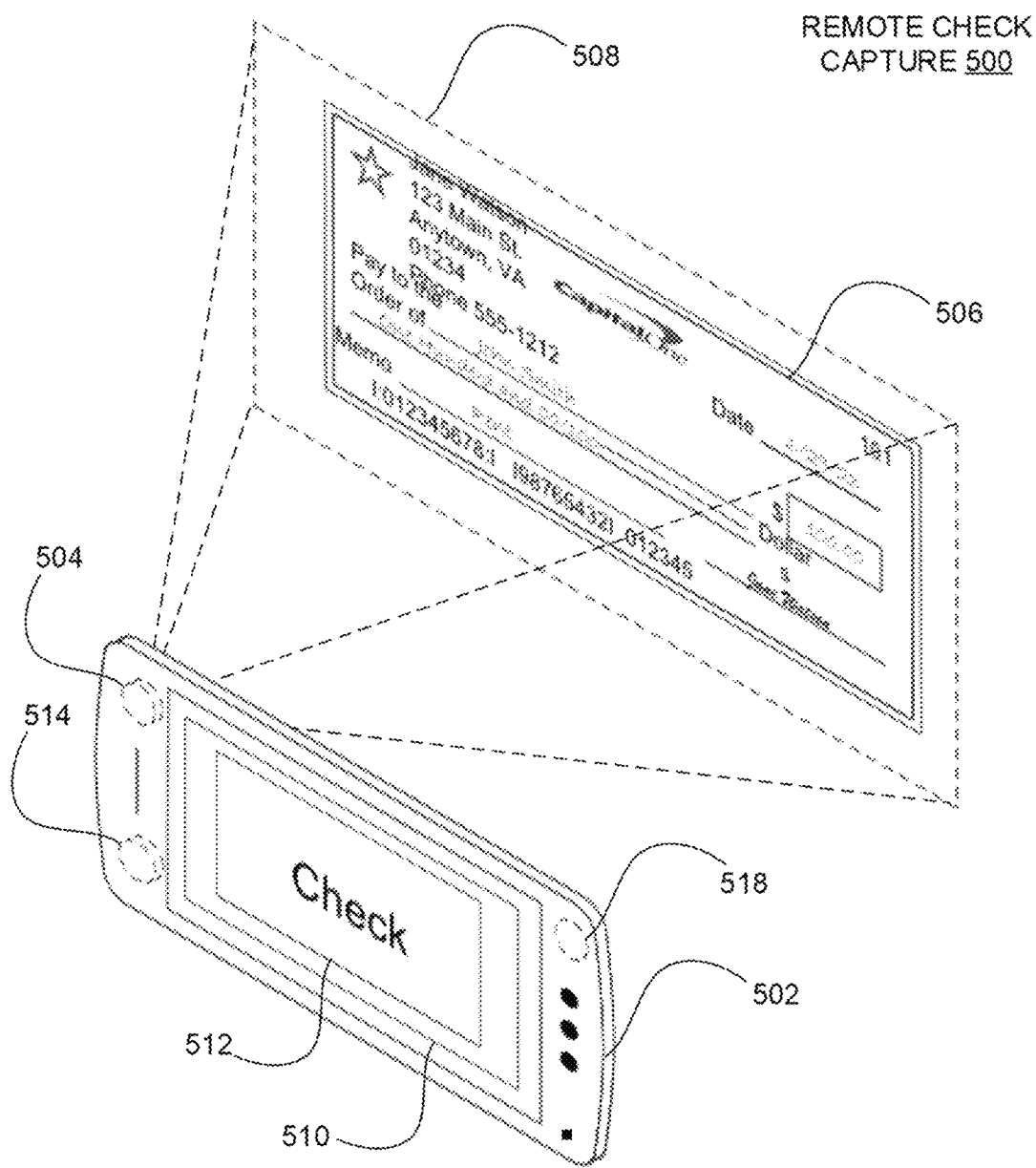
FIG. 5 illustrates an example remote check capture, according to some embodiments and aspects.

FIG. 5 illustrates an example remote check capture 500, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

Sample check 506, may be a personal check, paycheck, or government check, to name a few. In some embodiments, a customer will initiate a remote deposit check capture from their mobile computing device (e.g., smartphone) 502 (e.g., mobile device 107), but other digital camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a bank account (e.g., checking or savings) into which the funds specified by the check are to be deposited. Content associated with the document include the funds or monetary amount to be deposited to the customer's account, the issuing bank, the routing number, and the account number. Content associated with the customer's account may include a risk profile associated with the account and the current balance of the account. Options associated with a remote deposit process may include continuing with the deposit process or cancelling the deposit process, thereby cancelling depositing the check amount into the account.

Mobile computing device 502 may communicate with a bank or third party using a communication or network interface (not shown). Communication interface may communicate and interact with any combination of external devices, external networks, external entities, etc. For example, communication interface may allow mobile computing device 502 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app (e.g., app 109), select the account they want to deposit a check into, then select, for example, a "deposit check" option that will activate their mobile device's camera 504 (e.g., open a camera port). One skilled in the art would understand that variations of this approach or functionally equivalent alternative approaches may be substituted to initiate a mobile deposit.

In a computing device with a camera, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

Multiple cameras or lenses may separately, or in combination, capture specific blocks of imagery for data fields located within a document that is present, at least in part, within the field of view of the cameras. In another example, multiple cameras or lenses may capture more light than a single camera or lens, resulting in better image quality. In another example, individual lenses, or a combination of lenses, may generate depth data for one or more objects located within a field of view of the camera.

Using the camera 504 function on the mobile computing device 502, the customer captures one or more images that includes at least a portion of one side of a check 112. Typically, the camera's field of view 508 will include at least the perimeter of the check. However, any camera position that generates in-focus video of the various data fields located on a check may be considered. Resolution, distance, alignment, and lighting parameters may require movement of the mobile device until a proper view of a complete check, in-focus, has occurred. In some aspects, camera 504, LIDAR (light detection and ranging) sensor 514, and/or gyroscope sensor 518, may capture image, distance, and/or angular position, as described in greater detail herein.

An application running on the mobile computer device may offer suggestions or technical assistance to guide a proper framing of a check within the mobile banking app's graphically displayed field of view window 510, displayed on a User Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or capture techniques are considered to be within the scope of the technology described herein. Alternatively, the camera can be remote to the mobile computing device 502. In an alternative embodiment, the remote deposit is implemented on a desktop computing device with an accompanying digital camera.

Sample customer instructions may include, but are not limited to, "Once you've completed filling out the check information and signed the back, it's time to view your check," "For best results, place your check on a flat, dark-background surface to improve clarity," "Make sure all four corners of the check fit within the on-screen frame to avoid any processing holdups," "Select the camera icon in your mobile app to open the camera," "Once you've captured video of the front of the check, flip the check to capture video of the back of the check," "Do you accept the funds availability schedule?," "Swipe the Slide to Deposit button to submit the deposit," "Your deposit request may have gone through, but it's still a good idea to hold on to your check for a few days," "keep the check in a safe, secure place until you see the full amount deposited in your account," and "After the deposit is confirmed, you can safely destroy the check." These instructions are provided as sample instructions or comments but any instructions or comments that guide the customer through a remote deposit session may be included.

Figure 6:
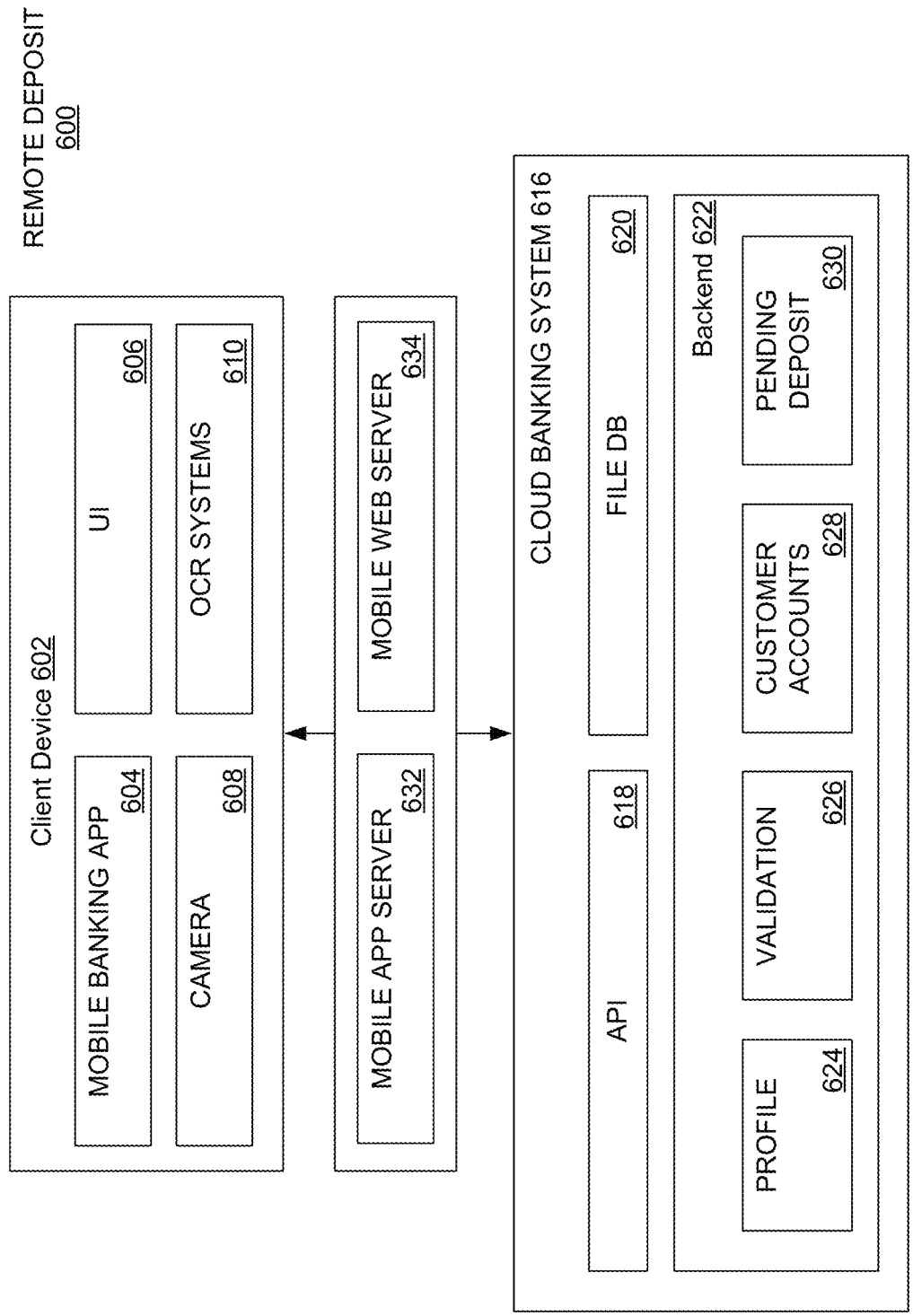
FIG. 6 illustrates a remote deposit system architecture, according to some embodiments and aspects.

FIG. 6 illustrates a remote deposit system architecture 600, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein.

Further, some of the operations may be performed simultaneously, or in a different order than described for FIG. 6, as will be understood by a person of ordinary skill in the art.

As described throughout, a client device 602 (e.g., mobile device 107) implements remote deposit processing for one or more financial instruments, such as checks. The client device 602 is configured to communicate with a cloud banking system 616 to complete various phases of a remote deposit as will be discussed in greater detail hereafter.

In aspects, the cloud banking system 616 may be implemented as one or more servers. Cloud banking system 616 may be implemented as a variety of centralized or decentralized computing devices. For example, cloud banking system 616 may be a mobile device, a laptop computer, a desktop computer, grid-computing resources, a virtualized computing resource, cloud computing resources, peer-to-peer distributed computing devices, a server farm, or a combination thereof. Cloud banking system 616 may be centralized in a single device, distributed across multiple devices within a cloud network, distributed across different geographic locations, or embedded within a network. Cloud banking system 616 can communicate with other devices, such as a client device 602. Components of cloud banking system 616, such as Application Programming Interface (API) 618, file database (DB) 620, as well as backend 622, may be implemented within the same device (such as when a cloud banking system 616 is implemented as a single device) or as separate devices (e.g., when cloud banking system 616 is implemented as a distributed system with components connected via a network).

Mobile banking app 604 (e.g., app 109) is a computer program or software application designed to run on a mobile device such as a phone, tablet, or watch. However, in a desktop application implementation, a mobile banking app equivalent may be configured to run on desktop computers, and web applications, which run in web browsers rather than directly on a mobile device. Apps are broadly classified into three types: native apps, hybrid and web apps. Native applications are designed specifically for a mobile operating system, such as, iOS or Android. Web apps are designed to be accessed through a browser. Hybrid apps may function like web apps disguised in a native container.

Financial instrument imagery may originate from, images or video streams (e.g., still images from video streams). A customer or user 110 using a client device 602, operating a mobile banking app 604 through an interactive UI 606, frames at least a portion of a check (e.g., identifiable fields on front or back of check) with a camera 608 (e.g., camera 108) within a field of view 106. And, as described herein, one or more images of the check may be captured.

In some embodiments, images may be provided to one or more specialized OCR systems 610, either resident on or accessible via a network connection to the client device 602. The OCR systems 610, processes the images to extract specific data (e.g., key information 148) located within the imaged sections of the check in the key images 150. Example key information 148, may include, but is not limited to single identifiable fields, such as the payor customer name 202, MICR data field 220 identifying customer and bank information (e.g., bank name, bank routing number, customer account number, and check number), date field 208, check amount 212 and written amount 214, and authentication (e.g., payee signature 222) and security fields 224 (e.g., watermark), etc., shown in FIG. 2D, which are processed and extracted by the OCR systems 610. In an embodiment, OCR is performed at the bank instead of on the mobile device.

In some embodiments, the result 149 with the extracted data identified within these fields may be communicated to file database (DB) 620 either through a mobile app server 632 or mobile web server 634 depending on the configuration of the client device 602 (e.g., mobile or desktop). In some embodiments, the extracted data identified within these fields may be communicated through the mobile banking app 604.

Alternatively, or in addition to, a thin client (not shown) resident on the client device 602 processes extracted fields locally with assistance from cloud banking system 616. For example, a processor (e.g., CPU) implements at least a portion of remote deposit functionality using resources stored on a remote server instead of a localized memory. The thin client connects remotely to the server-based computing environment (e.g., cloud banking system 616) where applications, sensitive data, and memory may be stored.

Backend 622, may include one or more system servers processing banking deposit operations in a secure environment. These one or more system servers operate to support client device 602. API 618 is an intermediary software interface between mobile banking app 604, installed on client device 602, and one or more server systems, such as, but not limited to the backend 622, as well as third party servers (not shown). The API 618 is available to be called by mobile clients through a server, such as a mobile edge server (not shown), within cloud banking system 616. File DB 620 stores files received from the client device 602 or generated as a result of processing a remote deposit.

Profile module 624 retrieves customer profiles associated with the customer from a registry after extracting customer data from front or back images of the financial instrument. Customer profiles may be used to determine deposit limits, historical activity, security data, or other customer related data.

Validation module 626 generates a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 602, cloud banking system 616 or third party systems or data.

Customer Accounts 628 includes, but is not limited to, a customer's banking information, such as individual, joint, or commercial account information, balances, loans, credit cards, account historical data, etc.

When remote deposit status information is generated, it is passed back to the client device 602 through API 618 where it is formatted for communication and display on the client device 602 and may, for example, communicate a funds availability schedule for display or rendering on the customer's device through the mobile banking app UI 606. The UI 606 may instantiate the funds availability schedule as images, graphics, audio, additional content, etc.

A pending deposit may include a profile of a potential upcoming deposit(s) based on an acceptance by the customer through UI 606 of a deposit according to given terms. If the deposit is successful, the flow creates a record for the transaction and this function retrieves a product type associated with the account, retrieves the interactions, and creates a pending check deposit activity.

Alternatively, or in addition to, one or more components of the remote deposit process may be implemented within the client device 602, third party platforms, the cloud-based banking system 616, or distributed across multiple computer-based systems. The UI 606 may instantiate the remote deposit status as images, graphics, audio, additional content, etc. In one technical improvement over current processing systems, the remote deposit status is provided mid-video stream, prior to completion of the deposit. In this approach, the customer may terminate the process prior to completion if they are dissatisfied with the remote deposit status.

In one aspect embodiment, remote deposit system 600 tracks customer behavior. For example, did the customer complete a remote deposit operation or did they cancel the request? In some aspects, the completion of the remote deposit operation reflects a successful outcome, while a cancellation reflects a failed outcome.

Figure 7:
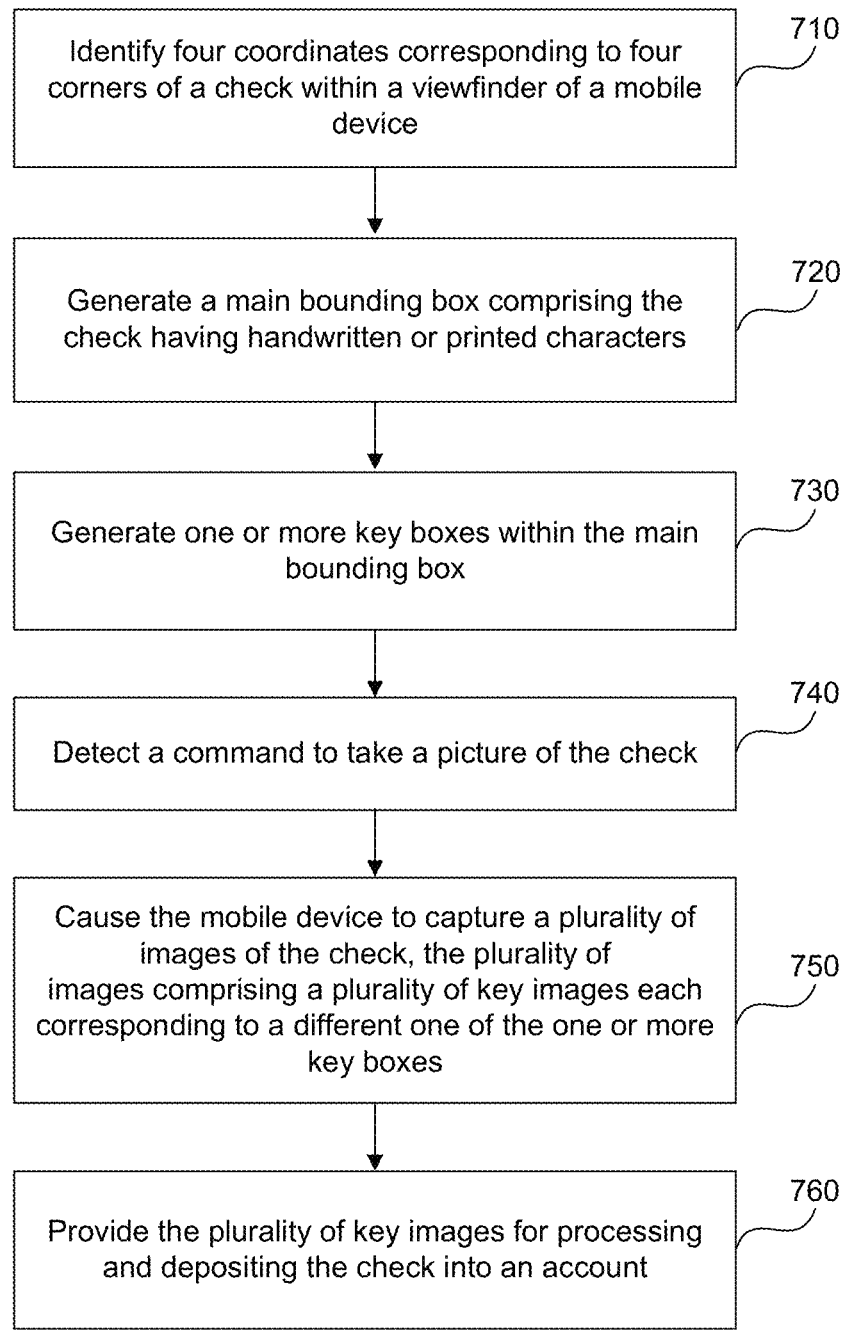
FIG. 7 is a flowchart illustrating example operations of a camera guide alignment and auto-capture system (CGS) with check deposit system and text extraction functionality, according to some embodiments.

FIG. 7 is a flowchart 700 illustrating example operations of a camera guide alignment and auto-capture system (CGS) 102 with check deposit system and text extraction functionality, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Without limiting method 700, method 700 is described with reference to elements in FIG. 1.

At 710, four coordinates corresponding to four corners of a check are identified within a viewfinder of a mobile device. For example, ICP 136 may identify the coordinates 140 corresponding to the four corners of a check (e.g., object 112) as displayed within a view 106 of a mobile device 107. In some embodiments, the check could be an image captured by a camera, a synthetic image that is generated using blended pixel techniques (as described above), or a physical check 112 that is placed in front of a lens 114 of a camera 108. In some embodiments, the coordinates 140 may correspond to the coordinates of a guide 104. In other embodiments, the coordinates 140 may correspond to the coordinates of the check as identified by an edge detection system, configured to detect the edges of the check 112 relative to a background or flat surface that is visually different from the check 112. In some embodiments, ICP 136 may take the input image 138, and identify the corners of the check 112 after taking the input image 138.

At 720, a main bounding box comprising the check having handwritten or printed characters is generated. For example, box generator 146 may generate a main box 152 based on the coordinates 140 or edges. As further illustrated in FIG. 2D, main box 252 may be aligned with or be generated based on the coordinates 140 of the four corners of the check 112. As illustrated in FIGS. 2B-2C, the check 112 may include both handwritten and printed characters on the front and the back of the check 112. These handwritten and printed characters may correspond, at least in part, to pieces of key information 148.

At 730, one or more key boxes within the main bounding box are generated. For example, box generator 146 may identify key information 148 which is to be extracted from the check. The key information 148 may categorize the various handwritten and/or printed characters from the check 112. Each piece of key information 148 may correspond to a particular location on the check 112 where the key information is generally located or likely to be located. In some embodiments, the location of various key information 148 may be derived from various checks in which the same key information (e.g., such as MICR) appear in the same or approximately the same location across different checks that have been processed by and/or are likely to be processed by CGS 102.

In some embodiments, the key boxes 154 may include horizontally aligned boxes. For example, box generator 142 may divide the image of the check 112 into multiple lengthwise segments or slices (but vertical segments or slices is also possible). Each lengthwise segment may be a different key box 154. Each lengthwise segment or key box 154 may be analyzed for any key information 148. The size of the lengthwise segments may be different to accommodate different key information 148 (e.g., signature may be a larger segment than the date). Alternatively, the segments may be the same size and multiple segments may be used to capture key information 148. In some embodiments, only the lengthwise segments that include key information 148 are transmitted to the bank.

In some embodiments, the key information 148 may vary across different types of checks (e.g., personal and standard) and different key information 148 may be relevant for different types of documents. Based on the key information 148, and corresponding location information, box generator 146 may generate one or more key boxes 154 directed to capturing an image of the corresponding key information 148 (e.g. in the form of handwritten and/or printed characters). As further illustrated in FIG. 2D, the check 112 may include various key boxes 254A-C within the bounds of the main box 252. In some embodiments, the key boxes 154 may be generated for both the front and the back of the check.

At 740, a command to take a picture of the check is detected. For example, user 110 may instruct mobile device 107 to take a picture. The picture may comprise an instruction to take a picture of the front of the check or the back of the back (e.g., as illustrated in FIG. 2C). In some embodiments, the command may be an auto-capture command issued by ICP 136.

At 750, the mobile device captures a plurality of images of the check, the plurality of pictures comprising a plurality of key images each corresponding to a different one of the one or more key boxes. For example, responsive to or upon receiving a take picture command from user 110 (or auto-capture command), ICP 136 may capture multiple images of the check 112 (or other object 112). For example, a single button press or 'take picture' command from the user 110, may result in ICP 136 capturing multiple images of the check 112, as corresponding to each key box 154, and the main box 152.

For example, ICP 136 may also capture an input image 138, encapsulating the entirety of the check, as encompassed within the bounds of main box 152. The input image 138 may capture all of the handwritten and printed characters from the check. 112 In some embodiments, the input image 138 may include a bitonal image of the check 112, which may be used for depositing/settling deposit of the check.

In some embodiments, ICP 136 may also capture one or more smaller images corresponding to each key box 154, referred to as key images 150, in addition to input image 138. Each key image 150 may only capture a portion of the handwritten and printed characters from the check 112, as visible within each key box 154. In some embodiments, the key images 150 may be automatically generated from the input image 138 and may include slices of the input image 138. For example, upon receiving a command to take a picture, CGS 102 may generate both input image 138 including an image of the full check and the key images 150 which may be slices of the input image 138 (or the output image 144).

At 760, the plurality of key images are provided for processing and depositing the check into the account. For example, each key image 150 may be provided to a specialized OCR system 146 which is trained to extract the key information 148 corresponding to that key image 150 based on the captured portion of handwritten and/or printed characters captured within that particular key image 150.

For example, a first OCR system 146 may be trained to extract MICR information from a first key image 150 corresponding to the MICR of the check, while a second OCR system 146 may be trained to extract amount information from a second key image 150 corresponding to the amount of the check. Each OCR system 148 may generate a result 149 that includes a computer readable version of the extracted handwritten and/or printed characters extracted from the key image 150 as corresponding to the key information 148. CGS 102 may provide the result 149 of computer-readable alphanumeric characters or symbols, from each OCR system 148, with the output image 144 of the entire check, for processing and remote check deposit into an identified financial account. In some embodiments, CGS 102 may also provide a bitonal version of the output image 144 for check processing and deposit as well. Alternatively, the multiple images related to the key boxes can be transmitted to the bank for further processing (e.g., OCR, duplicate detection, signature verification, deposit, settlement, etc.).

Figure 8:
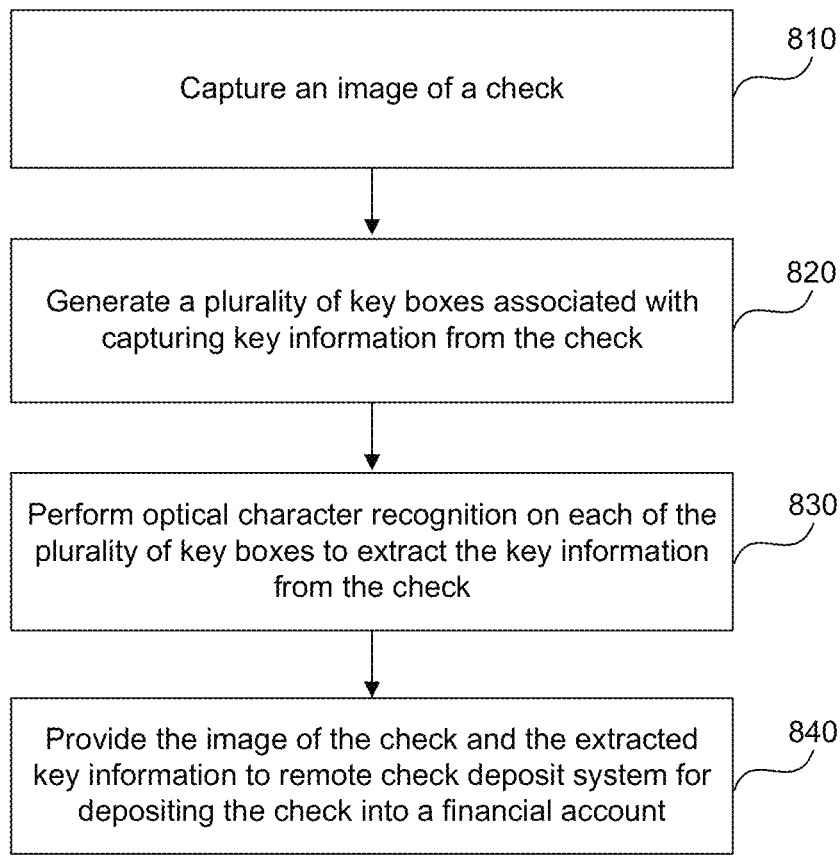
FIG. 8 is a flowchart illustrating additional example operations of a camera guide alignment and auto-capture system (CGS) with check deposit system and text extraction functionality, according to some embodiments.

FIG. 8 is a flowchart 800 illustrating additional example operations of a camera guide alignment and auto-capture system (CGS) 102 with check deposit system and text extraction functionality, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Without limiting method 800, method 800 is described with reference to elements in FIG. 1.

At 810, an image of a check is captured. For example, user 110 may align a check 112 in a guide 104 (which may be provided via app 109) and capture an input image 138 of the check 112.

At 820, a plurality of key boxes associated with capturing key information from the check are generated. For example, box generator 146 may generate key boxes 154 which are directed to capturing key information 148 from the check 112. Example key boxes 154 are further illustrated in FIG. 2D. In other embodiments, the key boxes 154 may be horizontal slices of the image of the check, or vertical slices. Each key box 154 may be a slice of the check 112 and only include the portion of the check 112 as contained within the key box 154. In some embodiments, each key box 154 may be its own independent image file, which can be processed or modified independently of other key boxes 154 and the input image 138 and output image 144 of the check 112.

At 830, optical character recognition is performed on each of the plurality of key boxes to extract the key information from the check. For example, the OCR system 146 of FIG. 1 may include multiple specialized OCR systems. Each specialized OCR system 146 may be configured to process a particular key box 154, and extract particular key information 148 that corresponds to that key box 154. Using specialized OCR systems 146 both improves the speed of processing (as different key images 150 may be processed in parallel), but may also improve the accuracy of the output of extracted text (because each OCR system is specially configured). However, in other embodiments, a general OCR system may be used to analyze all the key images 150 and extract any identifiable key information 148. In some embodiment, the result 149 may include the actual data (e.g., key information 148) that was identified by and extracted from the key images 150 by the specialized OCR systems 146 (and as such may include multiple results 149, one from each specialized OCR system). In an embodiment, the information in the key boxes are extracted using similar techniques at the bank instead of on the mobile device.

At 840, the image of the check and the extracted key information are provided to remote check deposit system for depositing the check into a financial account. For example, CGS 102 may provide both the results 149 and the output image 144 to a remote check deposit system (e.g., as illustrated in FIG. 6) for depositing the check 112 into a financial account (which may be identified or provided by the user 110 via app 109). Alternatively, only the output image 144 is provided to the bank for further processing and settlement.

Figure 9:
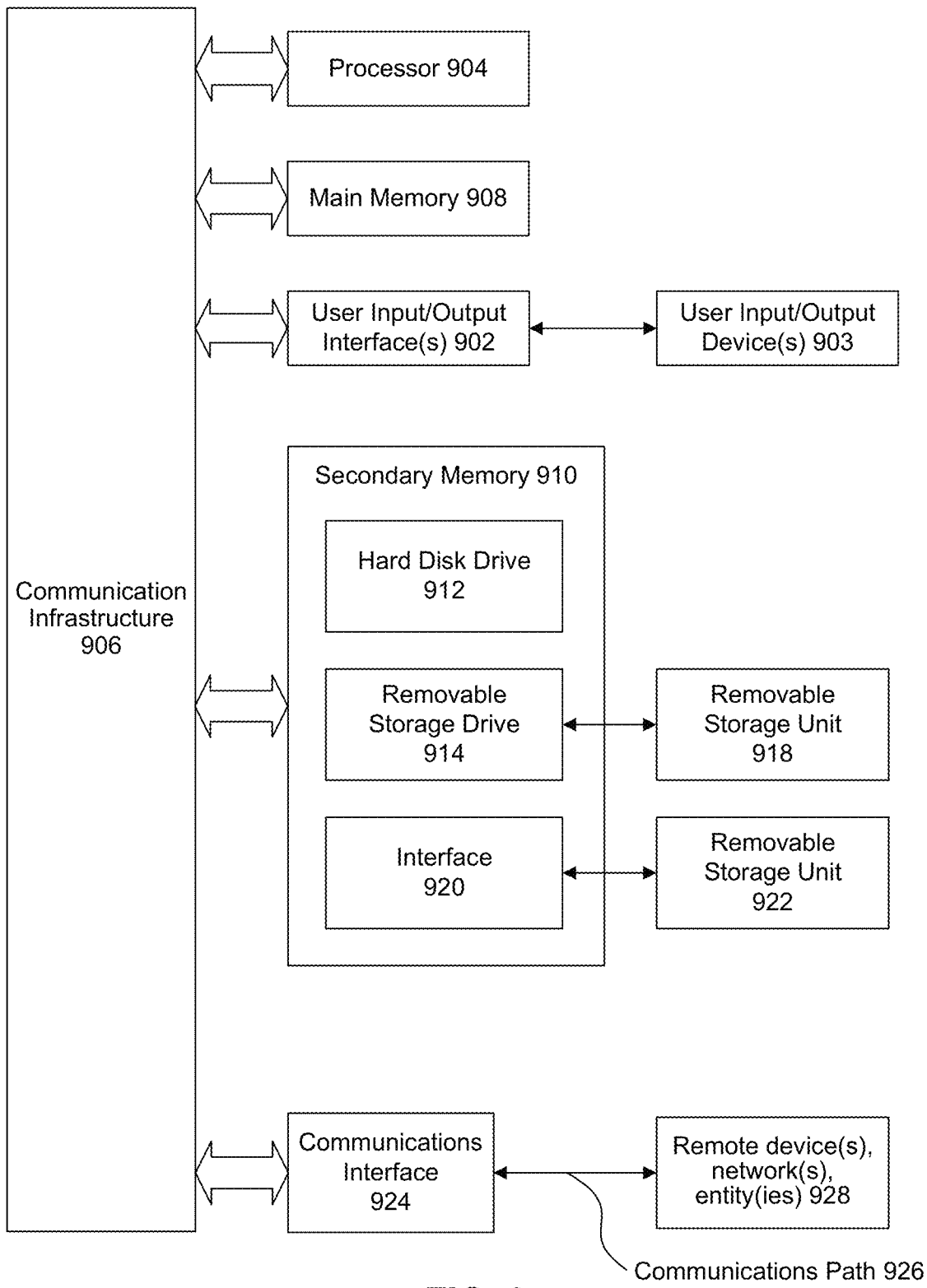
FIG. 9 is an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include customer input/output device(s) 903, such as monitors, keyboards, pointing devices, etc., which may communicate with communication infrastructure 906 through customer input/output interface(s) 902.

One or more processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
generating a base image of a document as displayed within a viewfinder of a camera that includes a visual guide;
identifying a tilt associated with the base image, where the tilt measures an angle of the camera relative to a flat plane upon which the document was placed;
identifying at least one coordinate corresponding to a position of the visual guide;
performing a perspective correction on the base image based on the at least one coordinate to generate a corrected image, wherein the corrected image comprises a new version of the base image in which the tilt is reduced;
providing a preview of the corrected image for display within the viewfinder, wherein the preview is displayed simultaneously with the base image; and
providing the corrected image for storage or further processing.

2. The computer-implemented method of claim 1, wherein the visual guide comprises an augmented reality projection on the flat plane within the viewfinder.

3. The computer-implemented method of claim 2, wherein the at least one coordinate corresponds to a position of the visual guide in a three-dimensional space of the flat plane.

4. The computer-implemented method of claim 1, wherein the identifying comprises identifying four coordinates corresponding to four corners of the visual guide.

5. The computer-implemented method of claim 3, further comprising:
performing one or more transformations to convert the at least one coordinate from the three-dimensional space to a new coordinate in a two dimensional space corresponding to the viewfinder.

6. The computer-implemented method of claim 1, wherein the preview of the corrected image includes the visual guide corresponding to four corners of the corrected image.

7. The computer-implemented method of claim 1, wherein the base image comprises a screenshot of the visual guide and the document as displayed in the viewfinder.

8. The computer-implemented method of claim 7, wherein the corrected image comprises a perspective corrected version of the document, wherein a portion of the screenshot outside of the visual guide is cropped out of the corrected image.

9. The computer-implemented method of claim 1, wherein the document comprises a check, and wherein the providing comprises providing the corrected image of the check for verification and deposit.

10. The computer-implemented method of claim 1, wherein the generating the base image comprises capturing an original image of the document using the camera wherein the base image comprises the original image.

11. A system comprising:
a memory; and
at least one processor coupled to the memory and configured to perform operations comprising:
generating a base image of a document as displayed within a viewfinder of a camera that includes a visual guide;
identifying a tilt associated with the base image, where the tilt measures an angle of the camera relative to a flat plane upon which the document was placed;
identifying at least one coordinate corresponding to a position of the visual guide;
performing a perspective correction on the base image based on the at least one coordinate to generate a corrected image, wherein the corrected image comprises a new version of the base image in which the tilt is reduced;
providing a preview of the corrected image for display within the viewfinder, wherein the preview is displayed simultaneously with the base image; and
providing the corrected image for storage or further processing.

12. The system of claim 11, wherein the visual guide comprises an augmented reality projection on the flat plane within the viewfinder.

13. The system of claim 12, wherein the at least one coordinate corresponds to a position of the visual guide in a three-dimensional space of the flat plane.

14. The system of claim 11, wherein the identifying comprises identifying four coordinates corresponding to four corners of the visual guide.

15. The system of claim 13, the operations further comprising:
performing one or more transformations to convert the at least one coordinate from the three-dimensional space to a new coordinate in a two dimensional space corresponding to the viewfinder.

16. The system of claim 11, wherein the preview of the corrected image includes the visual guide corresponding to four corners of the corrected image.

17. The system of claim 11, wherein the base image comprises a screenshot of the visual guide and the document as displayed in the viewfinder.

18. The system of claim 17, wherein the corrected image comprises a perspective corrected version of the document, wherein a portion of the screenshot outside of the visual guide is cropped out of the corrected image.

19. The system of claim 11, wherein the identifying the base image comprises capturing an original image of a check as displayed within the viewfinder of the camera, the original image comprising the visual guide that was displayed within the viewfinder and a check placed within a bounds of the visual guide, wherein the base image comprises the original image.

20. A non-transitory computer-readable medium having instructions stored thereon that, when executed by at least one computing device, cause the at least one computing device to perform operations comprising:
generating a base image of a document as displayed within a viewfinder of a camera that includes a visual guide;
identifying a tilt associated with the base image, where the tilt measures an angle of the camera relative to a flat plane upon which the document was placed;
identifying at least one coordinate corresponding to a position of the visual guide;
performing a perspective correction on the base image based on the at least one coordinate to generate a corrected image, wherein the corrected image comprises a new version of the base image in which the tilt is reduced;
providing a preview of the corrected image for display within the viewfinder, wherein the preview is displayed simultaneously with the base image; and providing the corrected image for storage or further processing.

* * * * *